United States Patent
Dojan et al.

(10) Patent No.: US 7,032,620 B2
(45) Date of Patent: Apr. 25, 2006

(54) VALVES AND METHODS FOR MANUFACTURING THE VALVES

(75) Inventors: Frederick J. Dojan, Vancouver, WA (US); Klaas P. Hazenberg, Portland, OR (US); Joel L. Passke, Hillsboro, OR (US)

(73) Assignee: Nike, Inc., Beaverton, OR (US)

( * ) Notice: Subject to any disclaimer, the term of this patent is extended or adjusted under 35 U.S.C. 154(b) by 0 days.

(21) Appl. No.: 11/125,947

(22) Filed: May 9, 2005

(65) Prior Publication Data

US 2005/0199303 A1    Sep. 15, 2005

Related U.S. Application Data

(62) Division of application No. 10/246,755, filed on Sep. 19, 2002, now Pat. No. 6,936,130.

(51) Int. Cl.
*F16K 15/14* (2006.01)
*B23B 31/20* (2006.01)

(52) U.S. Cl. ............... 137/843; 137/223; 137/517; 156/290

(58) Field of Classification Search ........... 137/223, 137/843, 844, 846, 517; 5/655.3; 36/3 R, 36/29; 493/929
See application file for complete search history.

(56) References Cited

U.S. PATENT DOCUMENTS

| | | | |
|---|---|---|---|
| 1,304,915 A | 5/1919 | Spinney | |
| 4,722,131 A | 2/1988 | Huang | |
| 4,917,646 A | 4/1990 | Kieves | |
| 5,026,339 A | 6/1991 | Kasper | |
| 5,074,765 A | 12/1991 | Pekar | |
| 5,144,708 A * | 9/1992 | Pekar | 137/223 |
| 5,295,892 A * | 3/1994 | Felton | 446/224 |
| 5,343,638 A | 9/1994 | Legassie et al. | |
| 5,372,487 A | 12/1994 | Pekar | |
| 5,460,200 A * | 10/1995 | Glicksman | 137/512.4 |
| 5,564,143 A * | 10/1996 | Pekar et al. | 5/708 |

(Continued)

FOREIGN PATENT DOCUMENTS

EP    0 850 674    7/1998

OTHER PUBLICATIONS

Article- Vernay Laboratories, Inc.—"Duckbill Check Valves"—Published 1998.

(Continued)

*Primary Examiner*—Ramesh Krishnamurthy
(74) *Attorney, Agent, or Firm*—Banner & Witcoff, Ltd.

(57) ABSTRACT

Valves and methods for manufacturing the valves are disclosed. The valves are formed from a plurality of flexible polymer layers. A radio frequency bonding process, or the like, is utilized to form welds between the various layers. In general, a sub-assembly is formed that includes a valve layer bonded to a substrate layer. The sub-assembly is bonded to a second element such that a channel is formed between the valve layer and the second element. The channel includes an inlet, an outlet, and a pair of weld beads located in the inlet that place the inlet in an open configuration.

29 Claims, 22 Drawing Sheets

U.S. PATENT DOCUMENTS

| | | |
|---|---|---|
| 5,813,142 A | 9/1998 | Demon |
| 5,826,349 A | 10/1998 | Goss |
| 5,950,332 A | 9/1999 | Lain |
| 6,042,448 A * | 3/2000 | Littlehorn .................... 446/220 |
| 6,085,444 A | 7/2000 | Cho |
| 6,192,917 B1 | 2/2001 | Ramos |
| 6,196,260 B1 * | 3/2001 | Pekar .................... 137/512.15 |
| 6,402,190 B1 * | 6/2002 | Heudorfer et al. .......... 280/729 |
| 6,602,105 B1 * | 8/2003 | Sussell ....................... 446/220 |
| 6,729,473 B1 * | 5/2004 | Anderson ................ 206/524.8 |

OTHER PUBLICATIONS

Label and Photographs of Model No. 9805 Urinary Leg Bag—Manufactured by Hollister, Inc.—This item of prior art was on sale at least one year prior to the filing date of the parent application.

Web site information of Model No. 9805 Urinary Leg Bag—Manufactured by Hollister, Inc. This item of prior art was on sale at least one year prior to the filing date of the parent application.

* cited by examiner

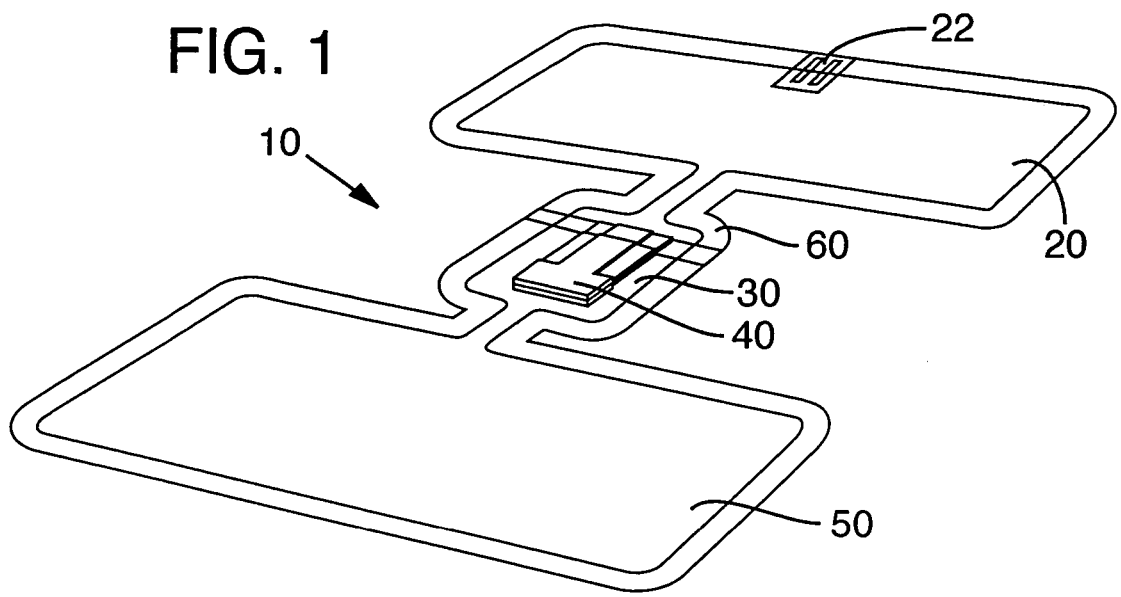
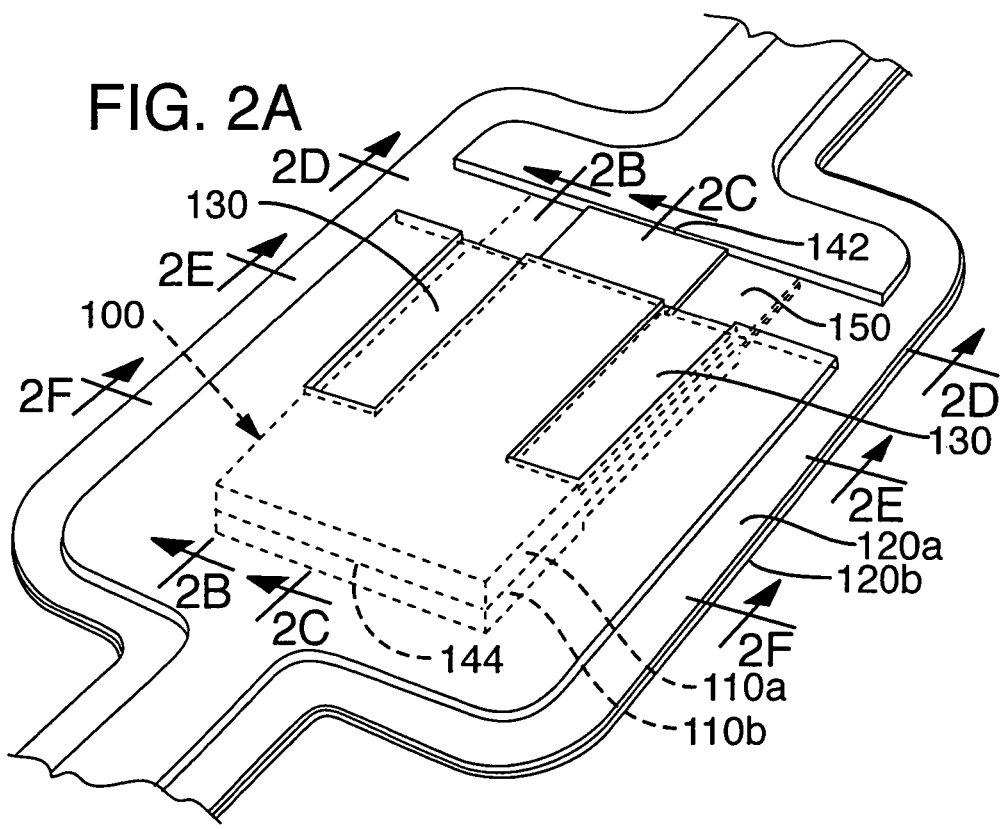

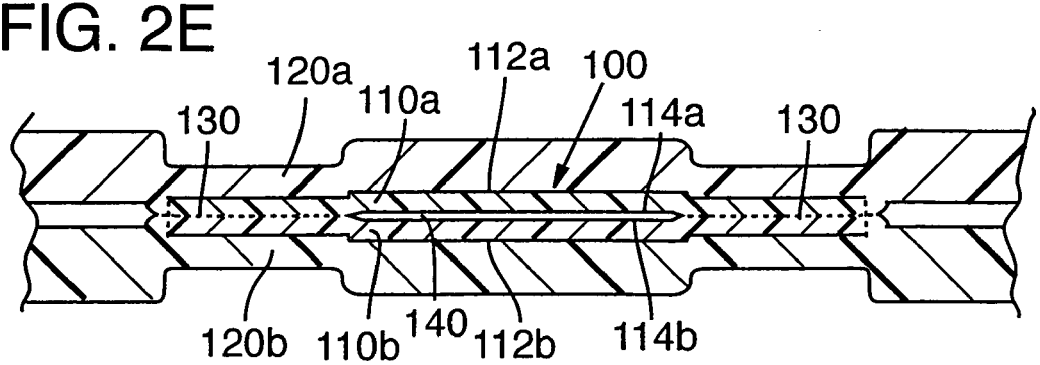
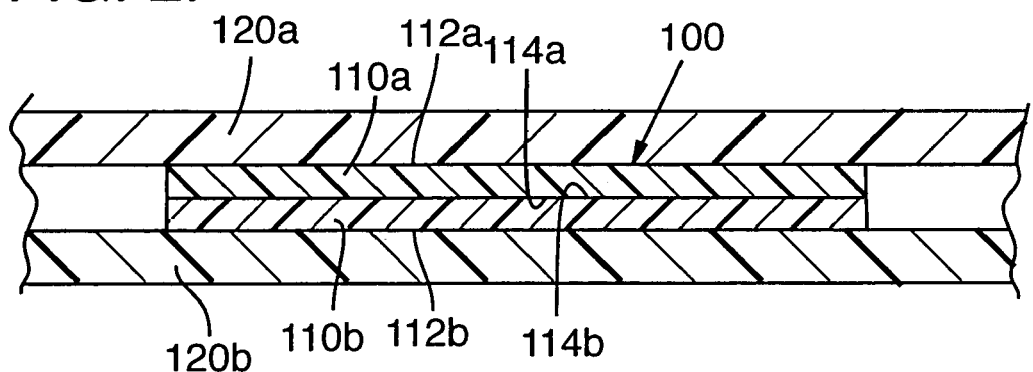
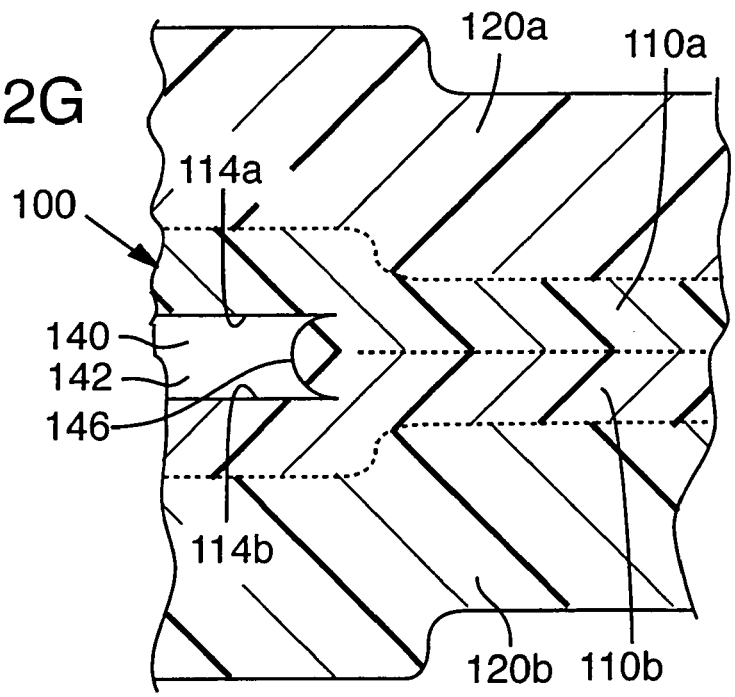

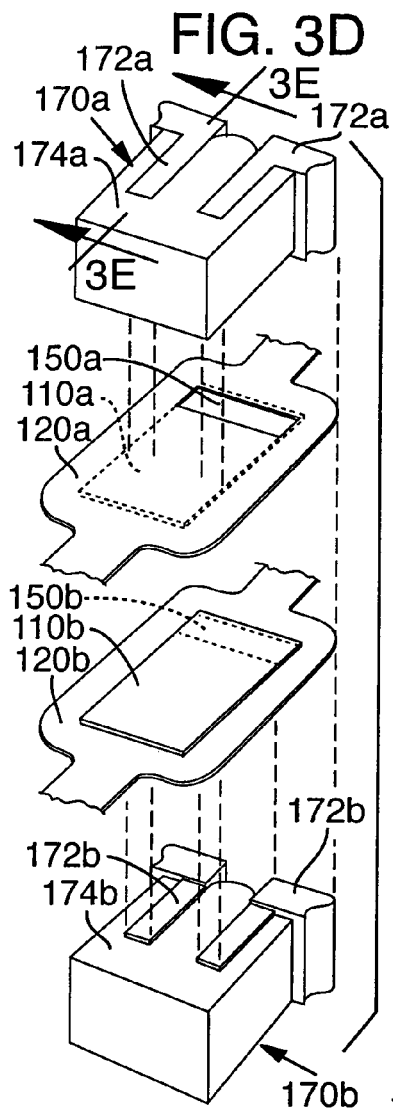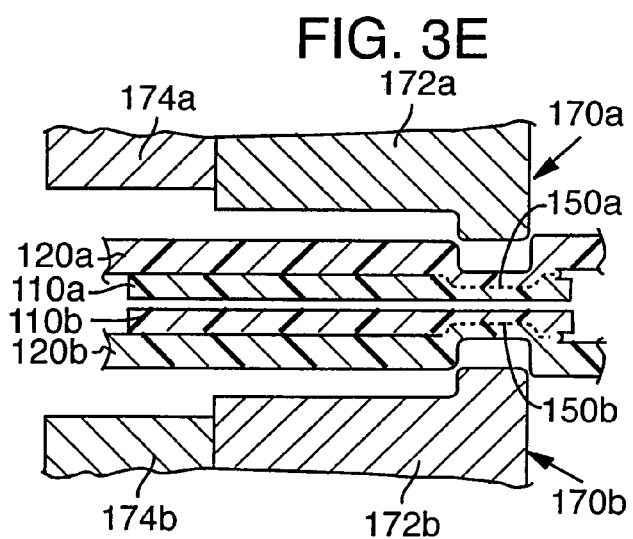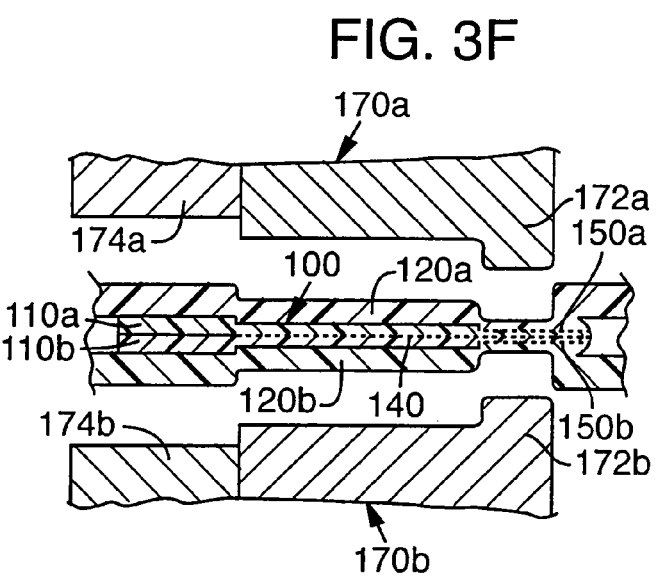

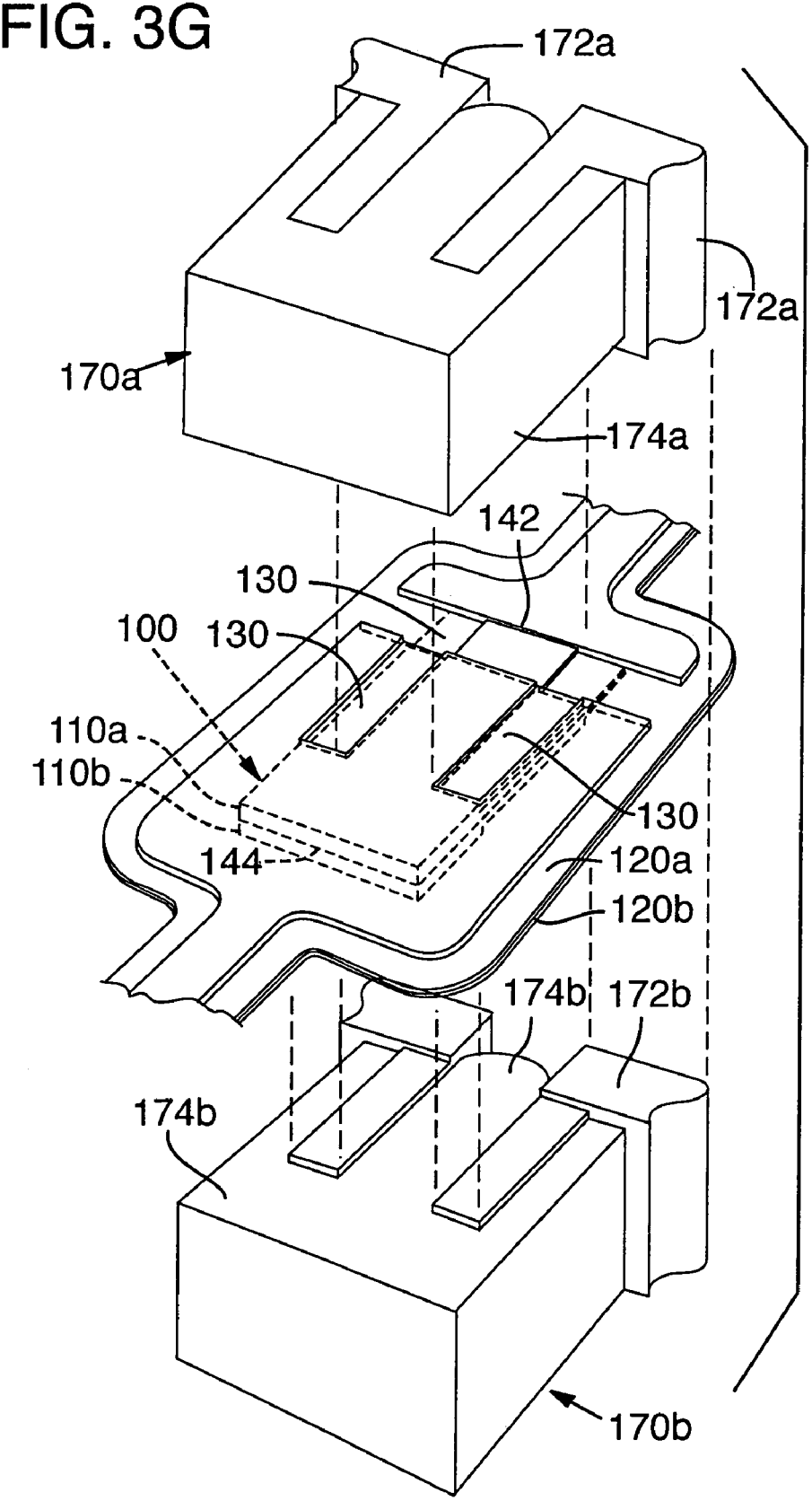

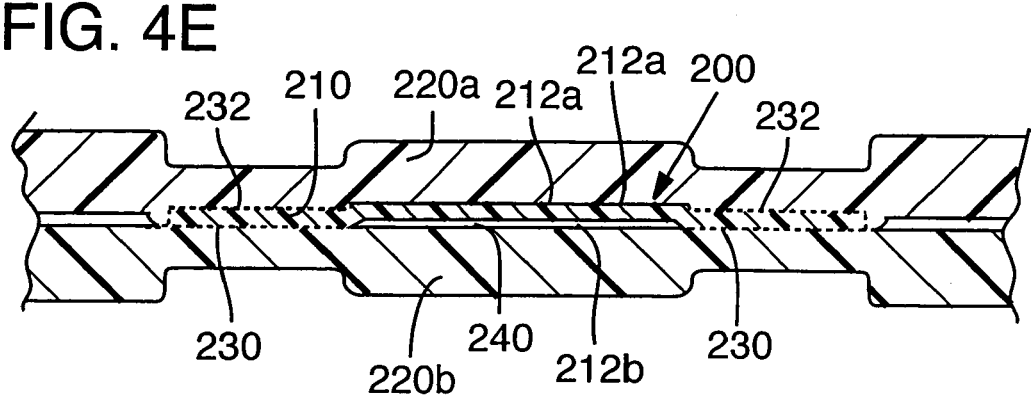
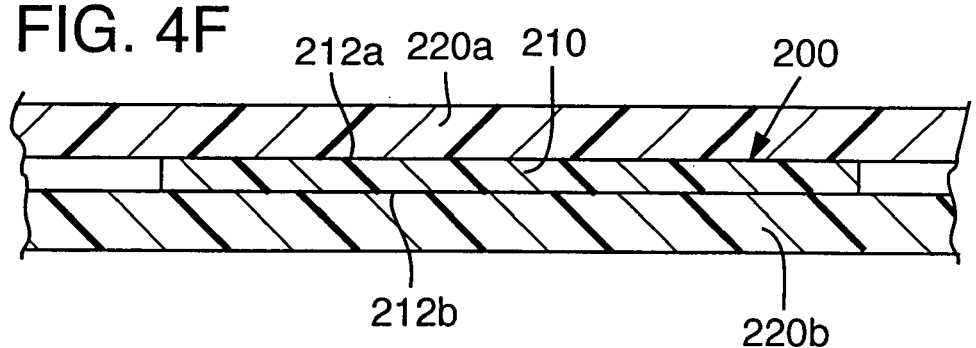
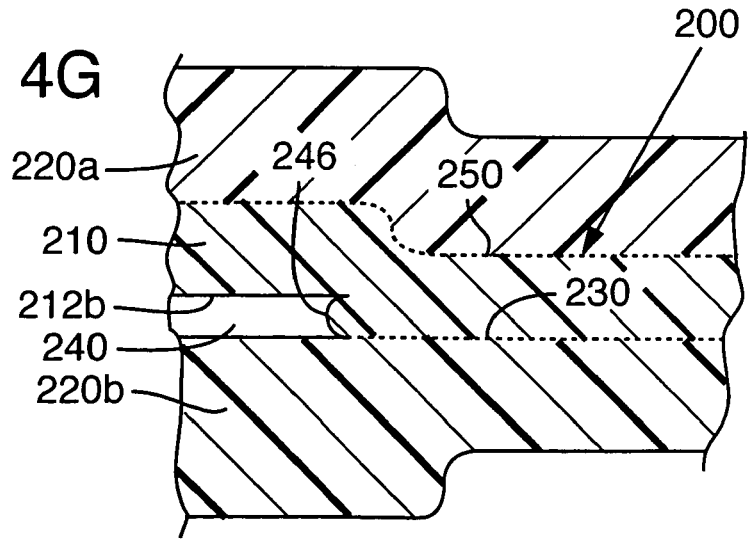

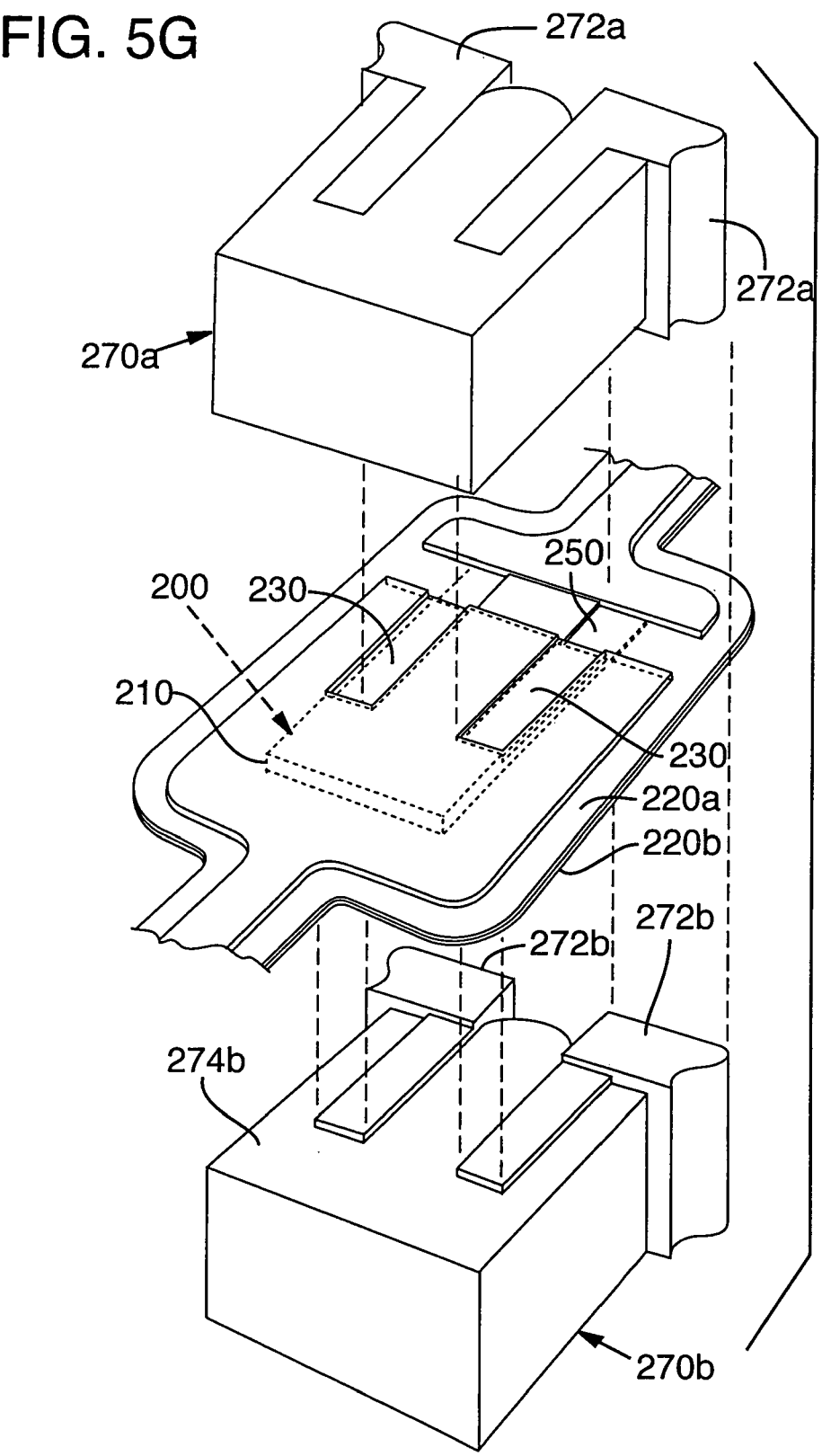

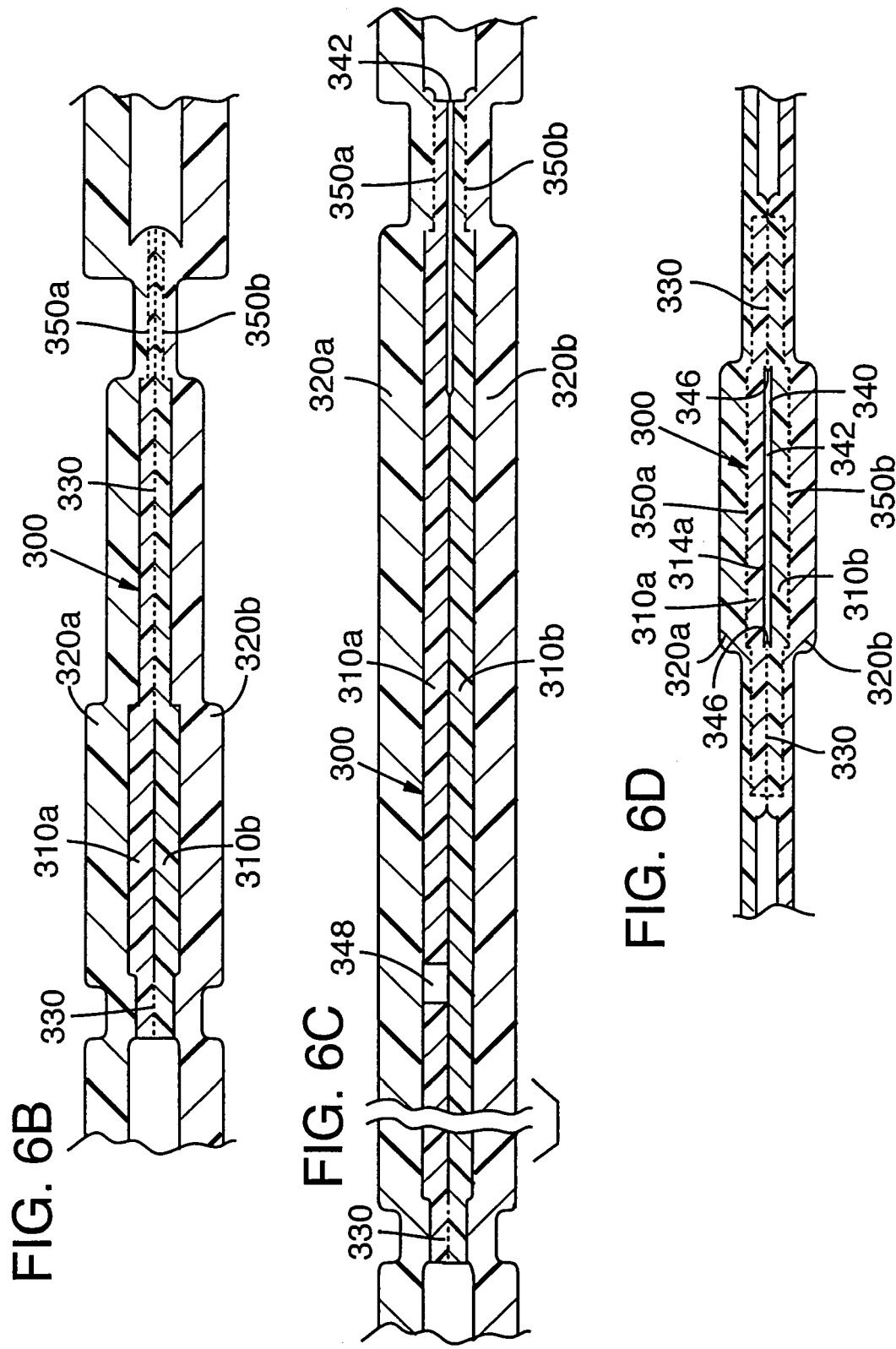

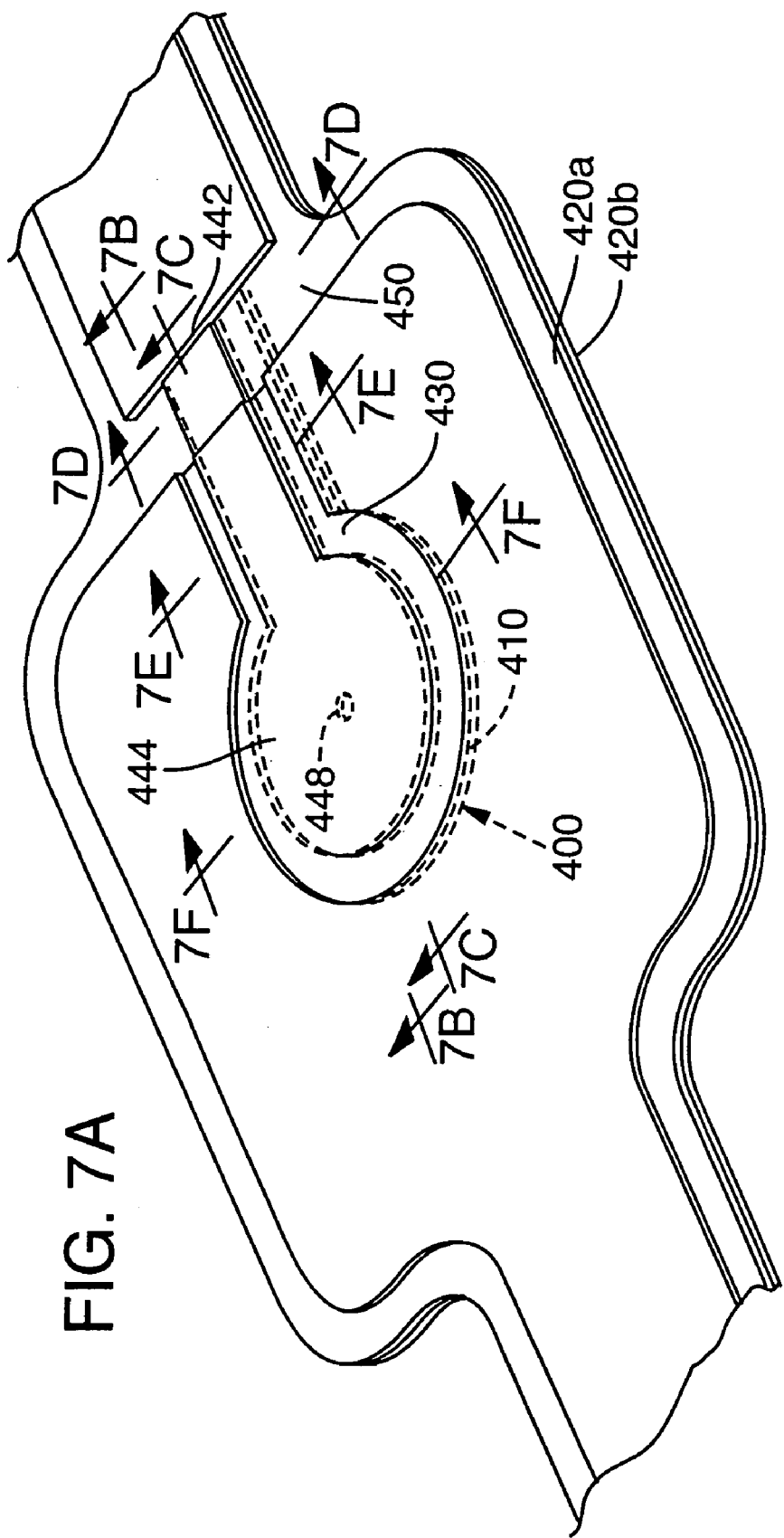

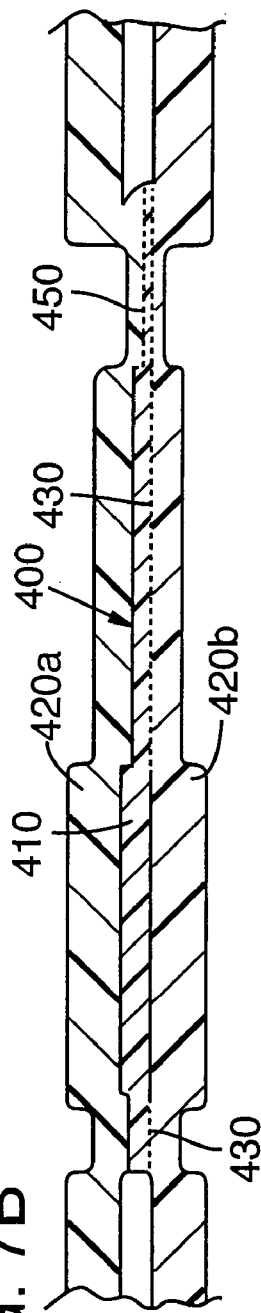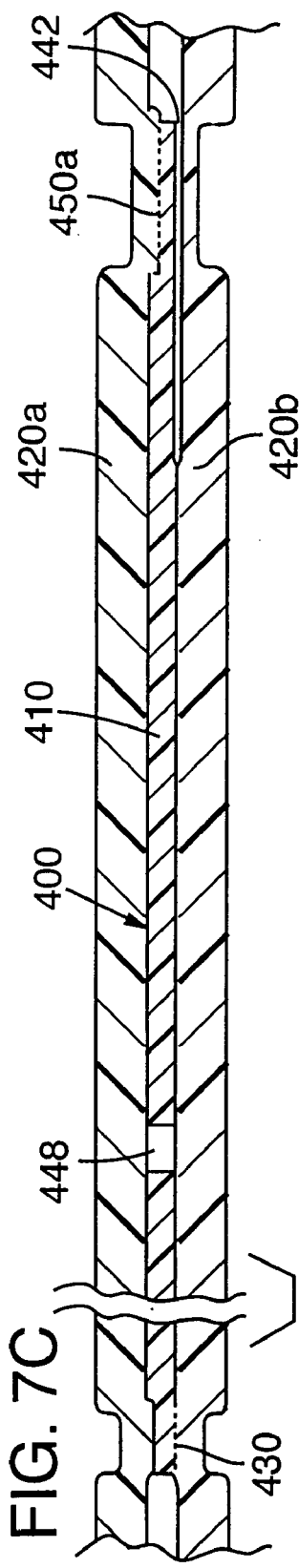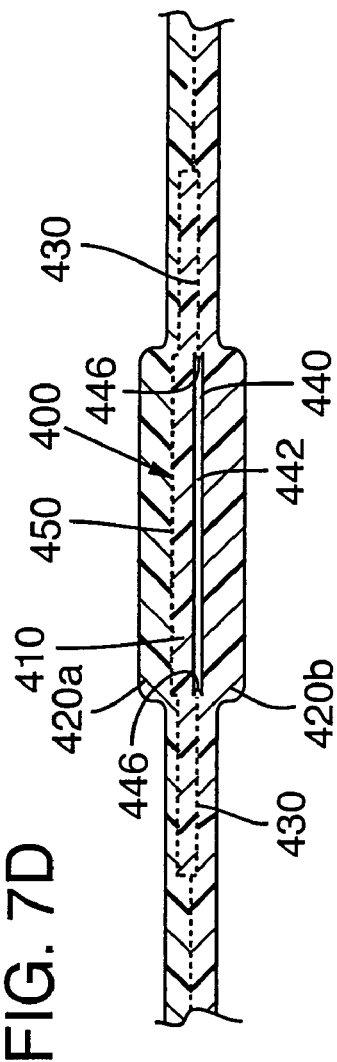
FIG. 7B
FIG. 7C
FIG. 7D

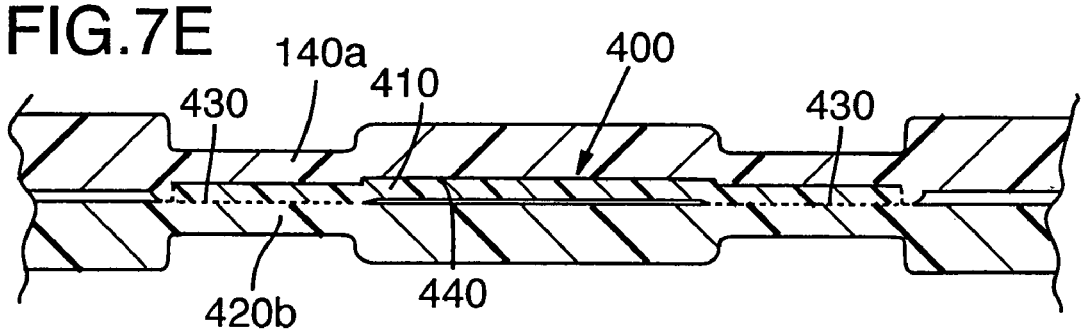
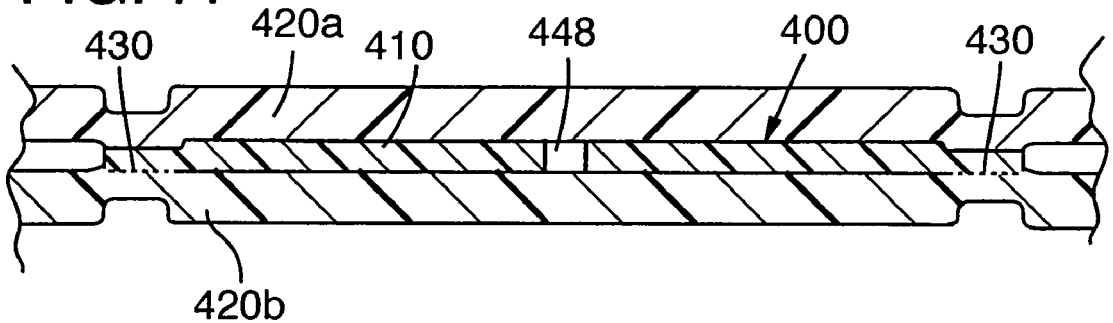
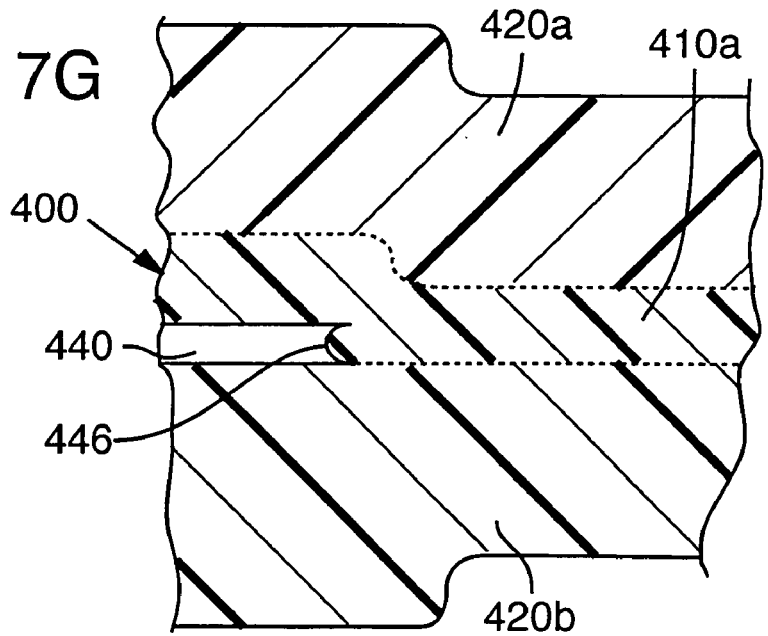

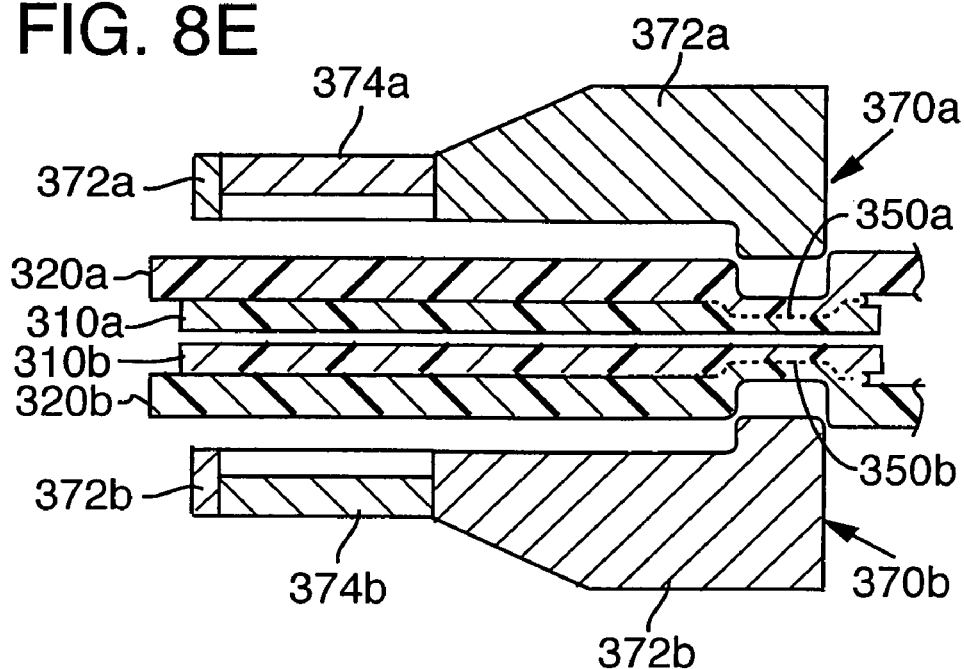
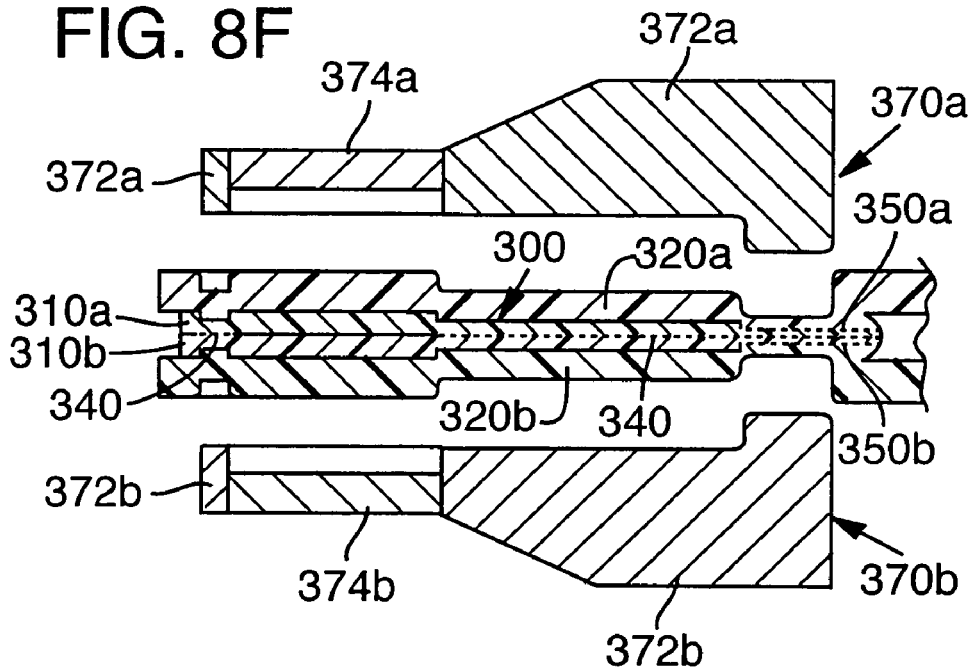

VALVES AND METHODS FOR MANUFACTURING THE VALVES

CROSS-REFERENCE TO RELATED APPLICATION

This U.S. Patent Application is a divisional application of and claims priority to U.S. patent application Ser. No. 10/246,755, which was filed in the U.S. Patent and Trademark Office on Sep. 19, 2002, now U.S. Pat. No. 6,936,130, and entitled Valves and Methods for Manufacturing the Valves, such prior U.S. Patent Application being entirely incorporated herein by reference.

BACKGROUND OF THE INVENTION

1. Field of the Invention

The present invention relates to fluid system valves. The invention concerns, more particularly, polymeric valves and methods for manufacturing the valves that limit, check, or otherwise direct fluid flow within a fluid system.

2. Description of Background Art

Modern articles of athletic footwear often include two primary elements, an upper and a sole structure. The upper comfortably secures the foot to the sole structure and may be formed of a combination of materials that are stitched or adhesively bonded together, including leather, thermoset foam, and textiles. The sole structure ordinarily includes multiple layers that are conventionally referred to as an insole, midsole, and outsole. The insole is a thin, padded member located adjacent to the foot that enhances the comfort of the footwear. The midsole forms the middle layer of the sole structure and often includes a resilient, foam material, such as polyurethane or ethylvinylacetate, that attenuates impact forces and absorbs energy when the footwear makes contact with the ground. The outsole is usually fashioned from a durable, wear resistant material and includes texturing to improve traction.

In addition to a foam material, midsoles may include a fluid system that relies upon valves to direct the flow of fluid within the system. Fluid systems may be used to achieve a variety of benefits including enhanced cushioning, improved fit, or ventilation of the upper. With respect to cushioning fluid systems, U.S. Pat. Nos. 5,558,395 and 5,937,462 to Huang disclose fluid systems that utilize ambient air to pressurize one or more bladders that are positioned within the midsole. One-directional valves, also referred to as check valves, permit air to enter a pump or inflation system but prevent, or check, fluid flow in the opposite direction. U.S. Pat. No. 4,446,634 to Johnson et al. and U.S. Pat. No. 5,794,361 to Sadler disclose self-contained fluid systems that include two bladders in fluid communication. The bladders are joined by conduits that include valves for directing fluid flow. With respect to ventilation, U.S. Pat. No. 6,085,444 to Cho discloses an article of ventilated footwear that includes a series of bladders and one-directional valves that draw outside air into the system and then discharge the air into the upper, thereby reducing or eliminating the presence of moisture in the area immediately surrounding the foot.

The fluid systems discussed above utilize a variety of valve types to direct fluid flow within the system. U.S. Pat. No. 5,144,708 to Pekar and U.S. Pat. No. 5,564,143 to Pekar et al. disclose one-directional valves formed of two polymer layers attached along opposite sides to form a channel between the layers. The valves are manufactured as a separate component and then incorporated into a fluid system. Manufacturing of the valves includes the use of a barrier material that prevents the valve layers from being bonded to each other when the valve is incorporated into a fluid system.

SUMMARY OF THE INVENTION

The present invention provides a method of manufacturing valves suitable for footwear fluid systems. The valves may be manufactured integral with the fluid systems, or the valves may be formed as separate components and subsequently incorporated into the fluid systems. In accordance with the method, a first sub-assembly is constructed by forming a substrate weld between a first valve layer and a first substrate layer, the first valve layer having an inlet end and an opposite outlet end. The first sub-assembly is then aligned with a second element such that the first valve layer is positioned between the first substrate layer and the second element. Finally, the first valve layer is bonded with the second element by forming a pair of spaced channel welds between the first valve layer and the second element. The channel welds define a channel located between the first valve layer and the second element and between the channel welds. The channel has an inlet adjacent to the inlet end of the valve layer and an opposite outlet adjacent to the outlet end of the valve layer.

The valves that are formed in accordance with this method are primarily one-directional valves, also referred to as check valves. One end of the channel forms an inlet for the valve and an opposite end forms an outlet. Fluid may enter the valve by flowing into the inlet. Fluid then progresses through the channel and exits the valve by passing through the outlet. Fluid flow in the opposite direction is restricted by the configuration of the channel outlet. The inlet may include two weld beads that place the inlet in an open configuration, thereby facilitating the entry of fluid. The outlet may have a variety of geometries, including an opening between the valve layer and the second element or an aperture formed in the valve layer.

In forming the first sub-assembly, the first valve layer is bonded to the first substrate layer such that the first valve layer is properly positioned on the first substrate layer during subsequent steps of the method. A first weld flow director is utilized to prevent a weld bead from forming adjacent to at least a portion of the bond area. When bonding the first valve layer to the second element, a second weld flow director is also utilized to prevent the formation of a weld bead along the channel, thereby ensuring that the layers forming the channel are configured to make contact and inhibit two-directional fluid flow. In the area of the inlet, however, a weld flow director is partially absent to encourage formation of the inlet weld beads.

A side effect of bonding the valve layer to the second element is that a corresponding weld may also be formed between the first valve layer and the first substrate layer. To inhibit the formation of this weld, a blocking material may be applied to a portion of the surface of the first valve layer that lies adjacent to the first substrate layer, or the blocking material may be applied to a surface of the first substrate layer. In some embodiments, a blocking material may also be located between the first valve layer and the second element. An example of a blocking material that may be positioned between the valve layers includes a polytetrafluoroethylene coating or layer.

The method discussed above may be utilized to form a variety of valve structures from multiple polymer layers. To provide examples of the various valve structures and methods for manufacturing the valve structures, three embodiments are disclosed. In a first embodiment of the present invention, four polymer layers are utilized and the second element is formed of a second valve layer and a second substrate layer, the channel being formed between the first and second valve layers. In a second embodiment of the present invention, three polymer layers are utilized and the second element is formed of a second substrate layer, the channel being formed between the first valve layer and the second substrate layer. One difference between the first and second embodiments is, therefore, the absence of the second valve layer in the second embodiment. In a third embodiment of the present invention, the channel welds are joined in the area of the outlet and an outlet aperture is formed through one of the valve layers. Fluid may then exit the valve of the third embodiment by passing through the outlet aperture. In a manner that is similar to the first and second embodiments, the third embodiment may be constructed from either three or four polymer layers.

The advantages and features of novelty characterizing the present invention are pointed out with particularity in the appended claims. To gain an improved understanding of the advantages and features of novelty, however, reference may be made to the following descriptive matter and accompanying drawings that describe and illustrate various embodiments and concepts related to the invention.

DESCRIPTION OF THE DRAWINGS

The foregoing Summary of the Invention, as well as the following Detailed Description of the Invention, will be better understood when read in conjunction with the accompanying drawings.

FIG. 1 is a perspective view of a fluid system including a valve in accordance with the present invention.

FIG. 2A is a perspective view of a first valve in accordance with a first embodiment of the present invention.

FIG. 2E is a fourth cross-sectional view of the first valve, as defined by line 2E—2E in FIG. 2A.

FIG. 2F is a fifth cross-sectional view of the first valve, as defined by line 2F—2F in FIG. 2A.

FIG. 2G is an enlarged view of a weld bead depicted in FIG. 2D.

FIG. 3D is a perspective view of a second bonding operation prior to formation of channel welds in accordance with the first embodiment.

FIG. 3E is a cross-sectional view of the second bonding operation prior to formation of channel welds, as defined by line 3E—3E in FIG. 3D.

FIG. 3F is a cross-sectional view, as depicted in FIG. 3E, of the second bonding operation following formation of the channel welds.

FIG. 3G is a perspective view of the second bonding operation, as depicted in FIG. 3D, following formation of the channel welds.

FIG. 4E is a fourth cross-sectional view of the second valve, as defined by line 4E—4E in FIG. 4A.

FIG. 4F is a fifth cross-sectional view of the second valve, as defined by line 4F—4F in FIG. 4A.

FIG. 4G is an enlarged view of a weld bead depicted in FIG. 4D.

FIG. 5G is a perspective view of the second bonding operation, as depicted in FIG. 5D, following formation of the channel welds.

FIG. 6B is a first cross-sectional view of the third valve, as defined by line 6B—6B in FIG. 6A.

FIG. 6C is a second cross-sectional view of the third valve, as defined by line 6C—6C in FIG. 6A.

FIG. 6D is a third cross-sectional view of the third valve, as defined by line 6D—6D in FIG. 6A.

FIG. 7A is a perspective view of a fourth valve in accordance with the third embodiment of the present invention.

FIG. 7B is a first cross-sectional view of the fourth valve, as defined by line 7B—7B in FIG. 7A.

FIG. 7C is a second cross-sectional view of the fourth valve, as defined by line 7C—7C in FIG. 7A.

FIG. 7D is a third cross-sectional view of the fourth valve, as defined by line 7D—7D in FIG. 7A.

FIG. 7E is a fourth cross-sectional view of the fourth valve, as defined by line 7E—7E in FIG. 7A.

FIG. 7F is a fifth cross-sectional view of the fourth valve, as defined by line 7F—7F in FIG. 7A.

FIG. 7G is an enlarged view of a weld bead depicted in FIG. 7D.

FIG. 8E is a cross-sectional view of the second bonding operation prior to formation of channel welds, as defined by line 8E—8E in FIG. 8D.

FIG. 8F is a cross-sectional view, as depicted in FIG. 8E, of the second bonding operation following formation of the channel welds.

DETAILED DESCRIPTION OF THE INVENTION

Introduction

Figure 2B:
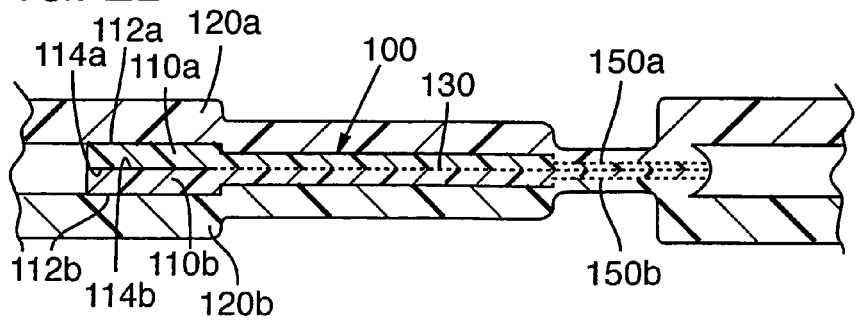
FIG. 2B is a first cross-sectional view of the first valve, as defined by line 2B—2B in FIG. 2A.

The following discussion and the appended figures disclose valves and various methods for manufacturing the valves in accordance with the present invention. The discussion and figures relate, more particularly, to valves that limit, check, or otherwise direct fluid flow within fluid systems and methods for manufacturing the valves. The valves, as disclosed, are particularly suited for use with footwear fluid systems and other types of athletic equipment. The concepts presented in the following discussion and figures, however, may also have applications in the medical, automotive, and aerospace industries, for example. Accordingly, the present invention is intended to encompass valves and methods for manufacturing the valves that are suitable for a wide range of products in diverse areas of manufacture.

An exemplar fluid system 10 is depicted in FIG. 1 and includes a pump chamber 20, a conduit 30, a valve 40, and a pressure chamber 50. Conduit 30 is configured to place pump chamber 20 and pressure chamber 50 in fluid communication. Valve 40 is located within conduit 30 and is configured to regulate fluid flow through conduit 30, thereby regulating fluid transfer between pump chamber 20 and pressure chamber 50. In general, the pressure of a fluid contained within pump chamber 20 rises as pump chamber 20 is compressed. When the pressure of the fluid within pump chamber 20 exceeds the pressure of the fluid in pressure chamber 50 plus a differential pressure that represents an opening pressure of valve 40, a portion of the fluid within pump chamber 20 is transferred to pressure chamber 50 by passing through conduit 30 and valve 40. An inlet 22 provides pump chamber 20 with access to fluid located outside system 10, thereby permitting the fluid within pump chamber 20 to be replenished following a transfer of fluid to pressure chamber 50.

Conduit 30 may be formed from two layers of polymeric material having edges that are bonded together by a peripheral bond 60, thereby forming a passage between the two layers. The components forming valve 40 may, therefore, be located between the layers forming conduit 30 prior to the formation of peripheral bond 60. Other components of fluid system 10, including pump chamber 20 and pressure chamber 50 may be formed integral with conduit 30 or separate from conduit 30 and subsequently attached.

Valve 40 may be a one-directional valve, also referred to as a check valve, that permits the fluid to flow from pump chamber 20 to pressure chamber 50, but prevents, or checks, fluid flow in the opposite direction. The following discussion discloses a plurality of valves 100, 200, and 300, and methods for manufacturing valves 100, 200, and 300, that are suitable replacements for valve 40. Valves 100, 200, and 300 are also suitable for use in other portions of fluid system 10. For example, one of valves 100, 200, or 300 may be located within inlet 22 to prevent fluid from exiting pump chamber 20 through inlet 22. Furthermore, valves 100, 200, and 300 may be utilized as relief valves that permit the fluid to exit the fluid system only after a predetermined pressure differential is achieved within a specific portion of the fluid system.

In a first embodiment of the present invention, a valve 100 and a method for manufacturing valve 100 integral with portions of a fluid system are disclosed. Valve 100 may also be manufactured separate from the fluid system and subsequently incorporated into the fluid system. In a second embodiment of the present invention, a valve 200 and a method for manufacturing valve 200 integral with portions of a fluid system are disclosed. The present invention also discloses a third embodiment, a valve 300, with an alternate outlet geometry that includes an aperture formed in one of the valve layers.

Fluid system 10 is intended to provide an example of a fluid system suitable for incorporating the valves of the present invention. A plurality of other fluid systems having varying degrees of complexity are also intended to fall within the scope of the present invention. The specific fluid system configuration may be selected by one skilled in the art depending upon the particular requirements for which the fluid system is being utilized.

FIRST EMBODIMENT

Figure 2C:
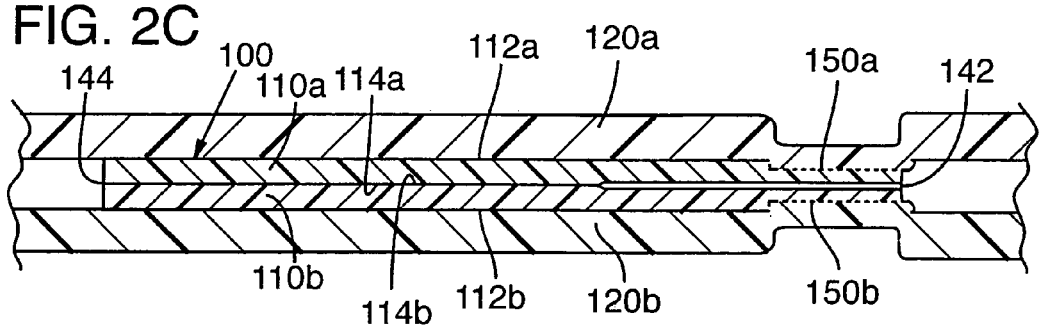
FIG. 2C is a second cross-sectional view of the first valve, as defined by line 2C—2C in FIG. 2A.
Figure 2D:
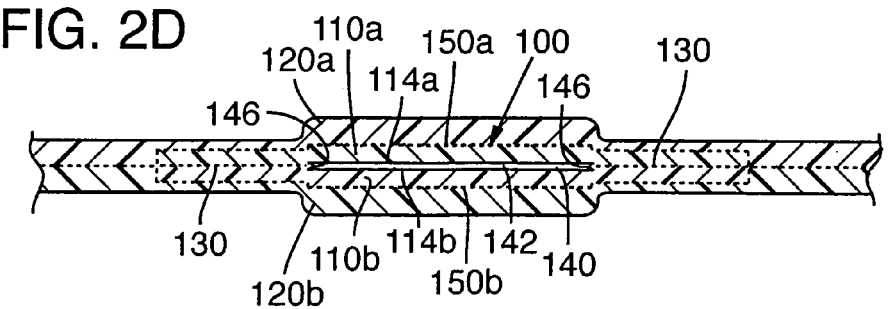
FIG. 2D is a third cross-sectional view of the first valve, as defined by line 2D—2D in FIG. 2A.

The components and function of a valve 100, depicted in FIG. 2, will now be discussed in greater detail. Valve 100 includes a first valve layer 110a and a second valve layer 110b that are positioned between a first substrate layer 120a and a second substrate layer 120b. With respect to fluid system 10, substrate layers 120 are analogous to the two polymer layers that form pump chamber 20, conduit 30, or pressure chamber 50, for example. One skilled in the art will recognize, however, that substrate layers 120 may also be the materials that form other types of fluid system components.

First valve layer 110a and second valve layer 110b are bonded together along opposite sides to form two channel welds 130 and define a channel 140 positioned between valve layers 110 and between channel welds 130. Channel 140 includes an inlet 142 and an outlet 144. Inlet 142 is biased in the open position by two inlet weld beads 146 formed of polymer material that collects in inlet 142 and adjacent to channel welds 130 during the bonding of first valve layer 110a and second valve layer 110b. Outlet 144 is located opposite inlet 142 and may be formed of unbonded portions of valve layers 110. Each valve layer 110 includes an outer surface 112 and an opposite inner surface 114. With regard to valve layer 110a, an outer surface 112a lies adjacent to substrate layer 120a and an inner surface 114a that lies adjacent to valve layer 110b. Similarly, valve layer 110b includes an outer surface 112b that lies adjacent to substrate layer 120b and an opposite inner surface 114b that lies adjacent to valve layer 110a.

Valve 100 also includes two substrate welds 150 that attach valve layers 110 to substrate layers 120. More specifically, substrate welds 150 attach valve layer 110a to substrate layer 120a and attach valve layer 110b to substrate layer 120b. As depicted in FIG. 2, substrate welds 150 are located adjacent to inlet 142. Substrate welds 150 may also be positioned adjacent to other portions of valve 100.

In operation, valve 100 permits fluid flow through channel 140 and in the direction from inlet 142 to outlet 144. Valve 100, however, significantly limits fluid flow in the opposite direction. As noted, inlet weld beads 146 bias inlet 142 in the open position. This configuration ensures that the fluid in the fluid system may enter at least the portion of channel 140 formed by inlet 142. The primary factor that determines whether the fluid may pass through valve 100 is the relative difference in pressure between the fluid in inlet 142 and the fluid at outlet 144. When the pressure of the fluid in inlet 142 exceeds the pressure of the fluid at outlet 144 plus an opening pressure of valve 100, the force that the fluid in inlet 142 exerts on inner surfaces 114 of valve layers 110 is sufficient to overcome the force that the fluid at outlet 144 exerts on outer surfaces 112, thereby permitting valve layers 110 to separate. When valve layers 110 separate, fluid may pass through channel 140. When the pressure of the fluid in inlet 142 is less than the pressure of the fluid at outlet 144, however, the force that the fluid in inlet 142 exerts on inner surfaces 114 of valve layers 110 is not sufficient to overcome the force that the fluid at outlet 142 exerts on outer surfaces 112, thereby preventing valve layers 110 from separating. When valve layers 110 are not separated, channel 140 is effectively closed to fluid transfer.

Outlet 144 assists in preventing the passage of fluid through valve 100 by ensuring that valve layers 110 make a hermetic contact. Note that channel welds 130 may extend less than the entire length of valve layers 110. Accordingly, outlet 144 may include unbonded portions of valve layers 110. The lack of bonds at outlet 144 permits unobstructed closure at outlet 144, thereby providing the hermetic contact between valve layers 110 that prevents fluid from passing between valve layers 110. Inner surfaces 114 may include a smooth, cohesive surface that facilitates closure of valve 100. Accordingly, the characteristics of inner surfaces 114 may also contribute to the hermetic contact and facilitate one-directional fluid flow through valve 100.

The materials forming valve layers 110 and substrate layers 120 should possess several characteristics. First, the materials should permit welds 130 and 150 to securely form between the various material layers using standard techniques, such as thermal contact, RF energy, laser, and infrared welding. Second, the materials should also be substantially impermeable to fluids, such as air. Third, the materials should possess sufficient flexibility to permit valve 100 to operate as described above. Fourth, the materials should be possess a durability that permits valve 100 to operate through numerous cycles. Fifth, the materials may be chosen to resist hydrolysis, or chemical breakdown due to the presence of water, if water or water vapor may be present around valve 100. Based upon these considerations, suitable materials include thermoplastic polyurethane, urethane, polyvinyl chloride, and polyethylene. When valve 100 is formed of thermoplastic polyurethane, a suitable thickness for valve layers 110 is 0.018 inches, but may range from 0.004 inches to 0.035 inches, for example. Similarly, a suitable thickness for substrate layers 120 is 0.030 inches, but may range from 0.015 inches to 0.050 inches, for example. The thickness of valve layers 110 and the thickness of substrate layers 120 may depart from the ranges listed above, however, depending upon the specific application for valve 100, the materials and manufacturing methods utilized, and the properties that valve 100 is intended to impart to the fluid system.

A benefit to locating substrate welds 150 adjacent to inlet 142 lies in the relatively large area of outer surfaces 112 that are exposed to the fluid at outlet 144. As noted above, when the pressure of the fluid in inlet 142 is less than the pressure of the fluid at outlet 144, the force that the fluid in inlet 142 exerts on inner surface 114 of valve layers 110 is not sufficient to overcome the force that the fluid at outlet 144 exerts on outer surfaces 112, thereby preventing valve layers 110 from separating and preventing the flow of fluid through valve 100. By configuring the position of valve layers 110 such that a relatively large area of outer surfaces 112 are exposed to the fluid at outlet 144, the area of contact between inner surfaces 114 increases proportionally. The primary mechanism that prevents fluid from passing through valve 100 is the hermetic contact properties of inner surfaces 114. Accordingly, increased efficiency is achieved by having a relatively large portion of outer surfaces 112 exposed to the fluid at outlet 144.

A method of manufacturing valve 100 integral with substrate layers 120 will now be discussed in relation to FIG. 3. One skilled in the art will recognize that valve 100 may also be manufactured separate from substrate layers 120, and subsequently incorporated into a fluid system, by omitting steps of the method that involve substrate layers 120. In general, the method involves two bonding operations. The first bonding operation, depicted in FIGS. 3A–3C, forms a first sub-assembly and a second sub-assembly that each include one substrate layer 120 and one valve layer 110. More specifically, the first bonding operation forms the first sub-assembly by bonding a portion of valve layer 110a to substrate layer 120a to form substrate weld 150a. The first bonding operation also forms a second sub-assembly through a similar operation that includes bonding a portion of valve layer 110b to substrate layer 120b to form substrate weld 150b. In the second bonding operation, depicted in FIGS. 3D–3F, the sub-assemblies are aligned such that valve layers 110 make contact and valve layers 110 are positioned between substrate layers 120. Channel welds 130 and inlet weld beads 146 are then formed, thereby completing the manufacture of valve 100. As described in greater detail below, a blocking material may be applied to outer surfaces 112 of valve layers 110 to prevent additional bonds from forming between valve layers 110 and substrate layers 120 during the second bonding operation. Alternately, the blocking material may be applied to the surfaces of substrate layers 120, or the blocking material may be an additional element of material positioned between valve layers 110 and substrate layers 120. The blocking material is not required, however, to manufacture valve 100.

Before performing the first bonding operation, valve layers 110 are individually formed. Valve layers 110 are depicted as having a rectangular geometry, but may have a plurality of alternate geometries that are also suitable for forming valve 100, including square, round, trapezoidal, or a non-regular geometry. One consideration regarding the geometry of valve layers 110 is the resulting length of channel 140. A channel 140 with a relatively long length may possess a greater opening pressure or lesser flow rate, for example, than a channel 140 with a relatively short length. Similarly, an outlet 144 with unbonded portions of valve layers 110 that have a relatively large surface area may seal more effectively than unbonded portions of valve layers 110 with a relatively small surface area. Outlet 144 may also be formed so as to flare outward and around the portion of channel 140 adjacent to outlet 144. Accordingly, valve layers 110 may have a variety of geometries and the specific geometry chosen should depend upon the specific application for which valve 100 is intended to be utilized and the specific properties that valve 100 is intended to possess. Examples of properties that may be affected by changes in geometry or materials include opening pressure, flow rate, and back flow rate. With regard to fluid system 10, a valve 100 with a high opening pressure may be utilized as a relief valve for pressure chamber 50, thereby limiting the total pressure in pressure chamber 50. Valve 22 of fluid system 10 may also be designed to have a specific opening pressure to limit the pressure within both pump chamber 20 and pressure chamber 50.

Once valve layers 110 are formed, they are positioned with respect to substrate layers 120. Typically, substrate layers 120 become one or more components of a fluid system. With respect to system 10, for example, substrate layers 120 could form opposing sides of conduit 30. Accordingly, valve layers 110 should be positioned on substrate layers 120 such that inlet 142 will be fluidly-accessible from the side of conduit 30 adjacent to pump chamber 20, and outlet 144 will be fluidly-accessible from the side of conduit 30 adjacent to pressure chamber 50, thereby placing pump chamber 20 in fluid communication with pressure chamber 50.

Following the positioning of valve layer 110a with respect to substrate layer 120a, substrate weld 150a may be formed. Radio Frequency (RF) welding, which utilizes RF energy, is one technique that may be utilized to bond two or more polymer layers. Other suitable bonding techniques include thermal contact, laser, and infrared welding. With regard to RF welding, an RF die compresses the desired bonding areas and is activated such that the areas of contact are irradiated with a specific level of RF energy for a predetermined period of time. The RF energy is absorbed by the polymer layers and the temperature of the polymer layers rise until portions of the polymer layers melt. Pressure applied to the molten polymer layers coupled with subsequent cooling forms a weld at the interface between the polymer layers. Typically, a portion of the molten polymer layers collects at the edges of the RF die because of the pressure that the RF die exerts on the area of contact. The collected polymer then cools to form a weld bead of formerly molten polymer material that surrounds the weld area. In applications where a weld bead is undesirable, or where a weld bead in certain locations is undesirable, a weld flow director may be added to the RF die. An RF die often includes a surface that contacts, places pressure upon, and heats the polymer layers. The weld flow director is an extension of the contact surface that does not generate RF energy to form bonds between the polymer layers. Instead, the weld flow director distributes the pressure of the RF die over a greater area to thereby prevent weld bead formation. Weld flow directors are often formed of non-conducting material or a material that is less conducting than the bonding portion of the RF die. Note that the absence of a weld flow director in a specific location may be utilized to place a weld bead in the specific location.

Figure 3A:
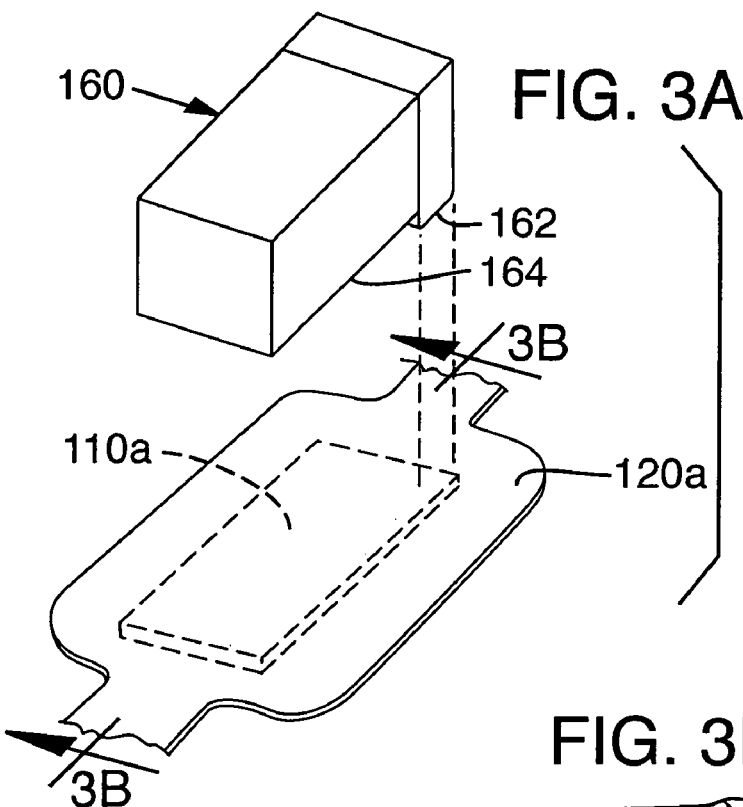
FIG. 3A is a perspective view of a first bonding operation prior to formation of a substrate weld in accordance with the first embodiment.
Figure 3B:
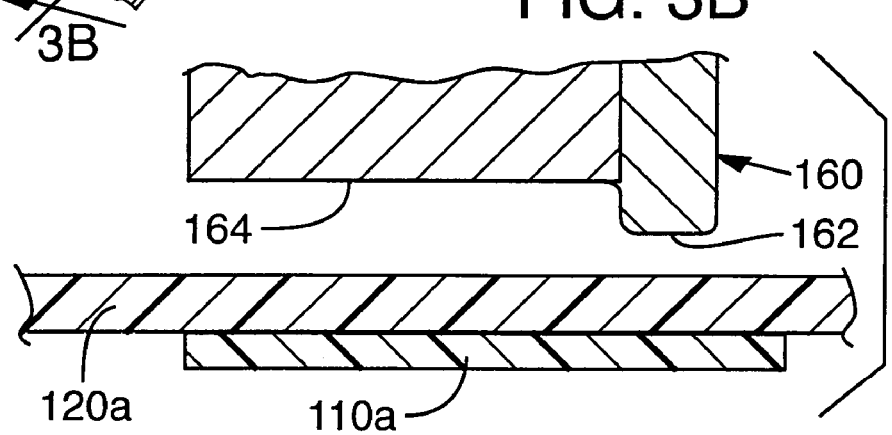
FIG. 3B is a cross-sectional view of the first bonding operation prior to formation of a substrate weld, as defined by line 3B—3B in FIG. 3A.
Figure 3C:
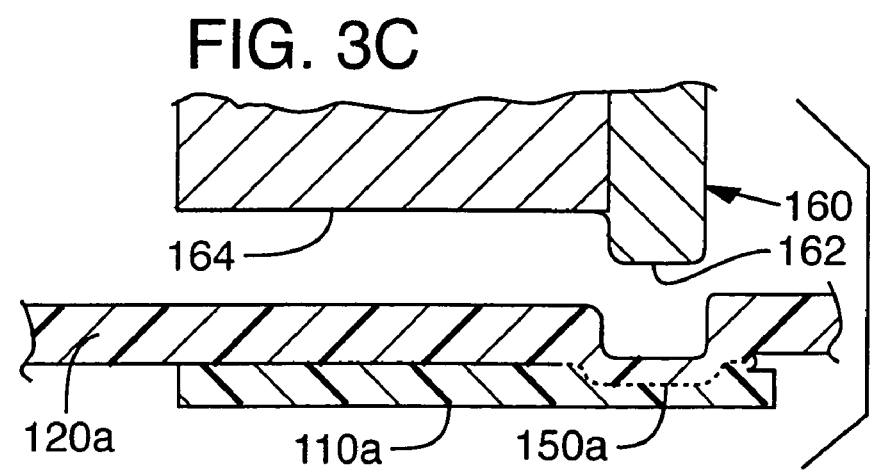
FIG. 3C is a cross-sectional view, as depicted in FIG. 3B, of the first bonding operation following formation of the substrate weld.
Figure 4A:
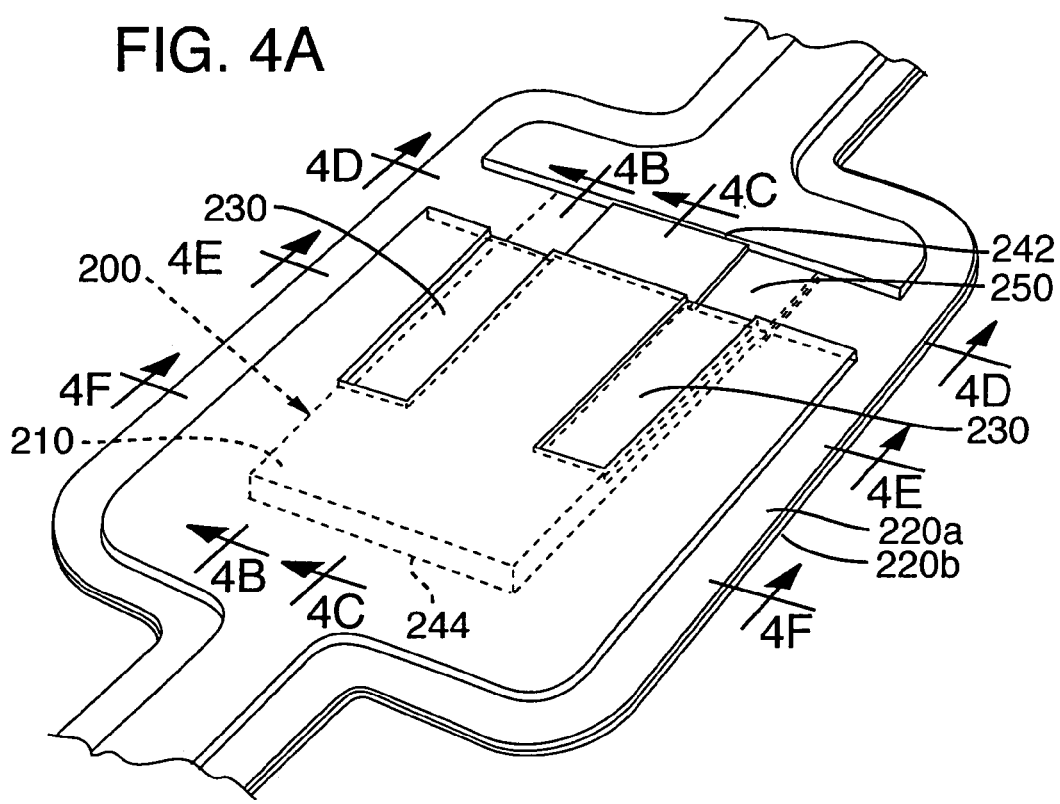
FIG. 4A is a perspective view of a second valve in accordance with a second embodiment of the present invention.
Figure 4B:
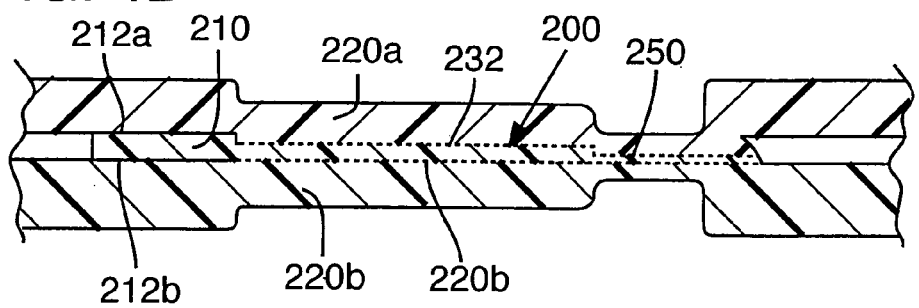
FIG. 4B is a first cross-sectional view of the second valve, as defined by line 4B—4B in FIG. 4A.
Figure 4C:
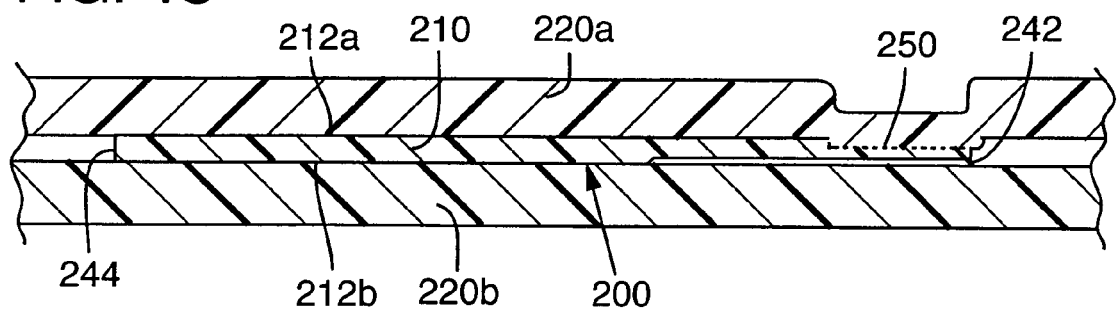
FIG. 4C is a second cross-sectional view of the second valve, as defined by line 4C—4C in FIG. 4A.
Figure 4D:
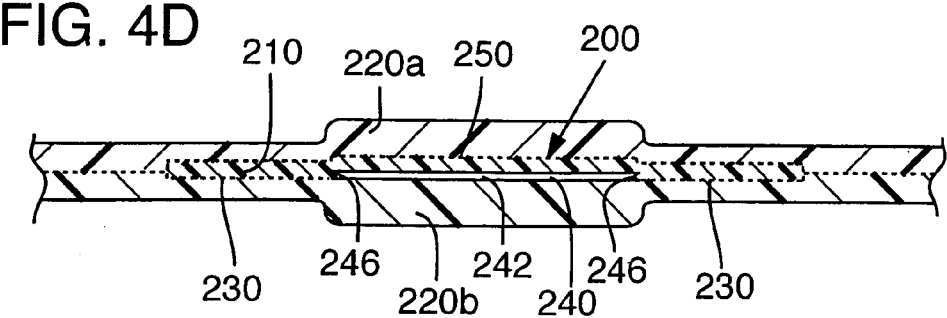
FIG. 4D is a third cross-sectional view of the second valve, as defined by line 4D—4D in FIG. 4A.

With reference to FIGS. 3A and 3B, valve layer 110a, substrate layer 120a, and an RF die 160 are depicted in their relative positions for purposes of the first bonding operation. Note that RF die 160 includes a bonding portion 162 and a weld flow director portion 164. Bonding portion 162 generates the RF energy that forms substrate weld 150a. The contact surface of bonding portion 162 has a rectangular shape with dimensions that are sufficient to bond valve layer 110a to substrate layer 120a across at least the width of inlet 142. Accordingly, bonding portion 162 will heat and bond at least a portion of the width of valve layer 110a to substrate layer 120a. Weld flow director portion 164 is configured to prevent a weld bead from forming adjacent to substrate weld 150a and between other portions of valve layer 110a and substrate layer 120a. Accordingly, weld flow director portion 164 places additional pressure upon the portion of valve layer 110a that is intended to remain unbonded to substrate layer 120a. Weld flow director portion 164 is not, however, configured to prevent the formation of a weld bead around other portions of substrate weld 150a. In further embodiments, weld flow director portion 164 may extend partially or completely around bonding portion 162.

In order to form substrate weld 150a, substrate layer 120a and valve layer 110a are positioned and compressed between RF die 160 and another surface, such as a flat plate or another die (not depicted). FIG. 3B is a cross-section that depicts the positions of RF die 160, substrate layer 120a, and valve layer 110a prior to bonding. FIG. 3C depicts the components following the formation of substrate weld 150a. Once substrate weld 150a is formed, the first sub-assembly is complete.

RF die 160 is depicted as having a stepped configuration between bonding portion 162 and weld flow director portion 164. As RF energy is emitted from bonding portion 162, the portion of valve layer 110a in contact with bonding portion 162 and a corresponding portion of substrate layer 120a will melt. A portion of the molten polymer material will flow out of the bond area, thereby decreasing the overall thickness of layers 110a and 120a adjacent to bonding portion 162, as depicted in FIG. 3C. Bonding portion 162 will, therefore, sink into substrate layer 120a, whereas weld flow director portion 164 will remain on the plane of substrate layer 120a. One suitable material for valve layers 110 and substrate layers 120 is thermoplastic polyurethane, as discussed above. Welds formed between two layers of thermoplastic polyurethane have sufficient strength and durability when the thickness of the weld area is reduced to approximately one-half of the total thickness of the layers prior to welding. Accordingly, bonding portion 162 may be configured, through the stepped configuration discussed above, to sink into substrate layer 120a to a depth that is one-half the unwelded thickness of valve layer 110a and substrate layer 120a.

Following the formation of the first subassembly, the second sub-assembly may be formed using a similar procedure. The second sub-assembly includes second substrate layer 120b and second valve layer 110b that are bonded together to form substrate weld 150b. The concepts discussed above with regard to formation of the first sub-assembly are applicable to the second sub-assembly. Accordingly, the discussion will now focus on the remaining portions of the manufacturing process.

The second bonding operation joins the first sub-assembly with the second sub-assembly to form valve 100. When incorporating valve 100 into fluid systems that are more complex than fluid system 10 further bonding operations may be required to form other components of the fluid system. Valve 100, however, is generally capable of being formed by the two bonding operations described herein. One skilled in the art will be able to make modifications to the method described herein to integrate valve 100 into more complex fluid systems.

With reference to FIGS. 3D and 3E, the first and second sub-assemblies are aligned such that first valve layer 110a is adjacent to second valve layer 110b and first substrate weld 150a is adjacent to second substrate weld 150b. That is, valve layers 110 are located between substrate layers 120 and portions of first valve layer 110a are aligned with corresponding portions of second valve layer 110b. Conventional methods may be employed to properly align the first sub-assembly with the second sub-assembly. For example, locating pins that correspond with apertures in the each of the sub-assemblies may be used to securely and simply align the sub-assemblies during manufacture. Locating pins may also be utilized in prior portions of the method to form the sub-assemblies, thereby ensuring that valve layers 110 are properly positioned during bonding with substrate layers 120.

Once the sub-assemblies are properly aligned, an RF die 170a and a separate RF die 170b are positioned on either side of the aligned sub-assemblies and used to form channel welds 130. RF die 170 may also include portions that bond substrate layers 120 to each other to form conduit 30 in fluid system 10, for example. Note that the second bonding operation may be completed with a single RF die 170. RF dies 170 each include a bonding portion 172 and a weld flow director portion 174. The sections of RF dies 170 that would be utilized to bond substrate layers 120 to each other are omitted from the depiction of RF dies 170 in FIG. 3D. Accordingly, the present discussion will focus on the bonding of valve layers 110.

In addition to forming channel welds 130, the second bonding operation inhibits the formation of inlet weld beads 146 adjacent to channel welds 130, except in the area of inlet 142. Bonding portions 172 are configured such that channel welds 130 are formed adjacent to inlet 142. Weld flow director portions 174 are located around the segments of bonding portions 172 responsible for forming channel welds 130. Accordingly, weld flow director portions 174 are located between the segments of bonding portions 172 that form channel welds 130 to prevent the formation of weld beads in channel 140. Weld flow director portions 174 also extend over the area of outlet 144, but do not extend between the segments of bonding portions 172 in the area of inlet 142. This configuration prompts the formation of inlet weld beads 146 between valve layers 110 and in inlet 142. As discussed above, inlet weld beads 146 place inlet 142 in the open position, thereby facilitating the entry of fluid in inlet 142.

Once the sub-assemblies are aligned with RF dies 170, the sub-assemblies are compressed between RF dies 170 to form channel welds 130. In addition, excess molten portions of valve layers 110 collect adjacent to inlet 142 to form inlet weld beads 146 due to the lack of weld flow director portions 174 in this area. FIG. 3E is a cross-section that depicts RF dies 170 and the subassemblies prior to the second bonding operation. FIG. 3F depicts the components following the formation of channel welds 130.

The various areas of RF dies 170 are depicted as having a stepped or offset configuration in FIGS. 3D–3F. Whereas RF die 160 included two offset surfaces, one for bonding portion 162 and a second for weld flow director portion 164, RF die 170 includes three offset surfaces. A careful review of the prior discussion and figures will reveal that a first portion of each channel weld 130 bonds portions of valve layers 110 that are utilized to form a portion of substrate welds 150, and a second portion of each channel weld 130 bonds previously unbonded portions of valve layers 110. Accordingly, a first portion of each bonding portion 172 is configured to fit within the indentation formed by substrate welds 150, as depicted in FIGS. 3E and 3F; a second portion of each bonding portion 172 is offset from the first portion of bonding portion 172 and configured to bond previously unbonded portions of valve layers 110; and weld flow director portion 174 is offset further and configured to compress valve layers 110 and substrate layers 120 to prevent weld bead formation.

In the method described above, substrate welds 150, as formed in the first bonding operation, are the solitary attachment sites between valve layers 110 and substrate layers 120. In order to prevent additional bonding between valve layers 110 and substrate layers 120 during the second bonding operation, a blocking material may be applied to a portion of outer surfaces 112 before the first bonding operation. Alternately, the blocking material may be applied to surfaces of substrate layers 120, or the blocking material may be an additional element of material positioned between valve layers 110 and substrate layers 120. Blocking materials prevent intermingling of molten polymers from two adjacent layers, thereby providing an effective means by which bonding is inhibited. The blocking material should be applied or positioned adjacent to the portion of outer surfaces 112 where bonding would otherwise occur, but not to portions of outer surfaces 112 where bonding is intended to occur. For example, the blocking material should not be applied to the area of outer surfaces 112 where substrate welds 150 are intended to occur, thereby facilitating the formation of substrate welds 150 during the first bonding operation. An appropriate location for applying a blocking material to outer surfaces 112 includes the area opposite the portion of inner surfaces 114 that are bonded to form channel welds 130, but not adjacent to inlet 142. Suitable blocking materials include layers or coatings that incorporate polytetrafluoroethylene, silicone, or mylar, for example. Alternatively, a blocking material may be omitted from outer surfaces 112, thereby forming a bond between substrate layers 120 and valve layers 110 during the second bonding operation. For some fluid systems, valve 100 functions properly when a bond is formed between substrate layers 120 and valve layers 110.

SECOND EMBODIMENT

The components and function of a valve 200, depicted in FIG. 4, will now be discussed in greater detail. Valve 200 includes a valve layer 210 that is positioned between a first substrate layer 220a and a second substrate layer 220b. With respect to fluid system 10, substrate layers 220 are analogous to the two polymer layers that form pump chamber 20, conduit 30, or pressure chamber 50, for example. One skilled in the art will recognize, however, that substrate layers 220 may also be the materials that form other types of fluid system components.

Valve layer 210 includes a first surface 212a that lies adjacent to substrate layer 220a and a second surface 212b that lies adjacent to substrate layer 220b. A substrate weld 250 is formed between first surface 212a and substrate layer 220a to prevent fluid from flowing between valve layer 210 and substrate layer 220a. A pair of channel welds 230 are formed between second surface 212b and substrate layer 220b to define a channel 240 positioned between channel welds 230 and between valve layer 210 and substrate layer 220b. Channel 240 includes an inlet 242 and an outlet 244. Inlet 242 is biased in the open position by two inlet weld beads 246 formed of polymer material that collects in inlet 242 and adjacent to channel welds 230 during the bonding of valve layer 210 and substrate layer 220b. Outlet 244 is located opposite inlet 242 and may be formed of unbonded portions of valve layer 210 and substrate layer 220b. In the first embodiment, valve 100 included and inlet 142 and an outlet 144 positioned between valve layers 110. In the second embodiment, however, inlet 242 and outlet 244 are formed between valve layer 210 and substrate layer 220b.

In operation, valve 200 permits fluid flow through channel 240 and in the direction from inlet 242 to outlet 244. Valve 200, however, significantly limits fluid flow in the opposite direction. As noted, inlet weld beads 246 bias inlet 242 in the open position. This configuration ensures that the fluid in the fluid system may enter at least the portion of channel 240 formed by inlet 242. The primary factor that determines whether the fluid may pass through valve 200 is the relative difference in pressure between the fluid in inlet 242 and the fluid at outlet 244. When the pressure of the fluid in inlet 242 exceeds the pressure of the fluid at outlet 244 plus an opening pressure of valve 200, the force that the fluid in inlet 242 exerts on second surface 212b of valve layer 210 is sufficient to overcome the force that the fluid at outlet 244 exerts on first surface 212a, thereby permitting valve layer 210 to separate from substrate layer 220b. When valve layer 210 separates from substrate layer 220b, fluid may pass through channel 240. When the pressure of the fluid in inlet 242 is less than the pressure of the fluid at outlet 244, however, the force that the fluid in inlet 242 exerts on second surface 212b of valve layers 210 is not sufficient to overcome the force that the fluid at outlet 242 exerts on first surfaces 212a, thereby preventing separation of valve layer 210 and substrate layer 220b. When valve layer 210 and substrate layer 220b are not separated, channel 240 is effectively closed to fluid transfer.

Outlet 244 assists in preventing the passage of fluid through valve 200 by ensuring that valve layer 210 and substrate layer 220b make a hermetic contact. Note that channel welds 230 may extend less than the entire length of valve layer 210. Accordingly, outlet 244 may include unbonded portions of valve layer 210 and substrate layer 220b. The lack of bonds at outlet 244 permits unobstructed closure at outlet 244, thereby providing the hermetic contact between valve layer 210 and substrate layer 220b that prevents the passage of fluid through valve 200. Second surface 212b and the facing surface of substrate layer 220b may have a smooth, cohesive surface that facilitates closure of valve 200. Accordingly, the characteristics of second surface 212b and the surface of substrate layer 220b may also contribute to the hermetic contact and facilitate one-directional fluid flow through valve 200.

One skilled in the art will recognize that valve 100 and valve 200 differ in two significant aspects. First, valve 200 utilizes only one valve layer 210 rather than two valve layers 110. This configuration has the potential to decrease the overall thickness of the fluid system in the area surrounding valve 200. This configuration also decreases the quantity of material utilized to form valve 200, thereby decreasing overall cost. Second, valve 200 relies upon substrate layer 220b to form a portion of channel 240, thereby utilizing existing fluid system components to form portions of valve 200.

The materials forming valve layer 210 and substrate layers 220 should possess several characteristics. First, the materials should permit welds 230 and 250 to securely form between the various material layers using standard techniques, such as thermal contact, RF energy, laser, and infrared welding. Second, the materials should also be substantially impermeable to fluids, such as air. Third, the materials should possess sufficient flexibility to permit valve 200 to operate as described above. Fourth, the materials should be possess a durability that permits valve 200 to operate through numerous cycles. Fifth, the materials may be chosen to resist hydrolysis, or chemical breakdown due to the presence of water, if water or water vapor may be present around valve 200. Based on these considerations, suitable materials include thermoplastic polyurethane, urethane, polyvinyl chloride, and polyethylene. When valve 200 is formed of thermoplastic polyurethane, a suitable thickness for valve layer 210 is 0.018 inches, but may range from 0.004 inches to 0.035 inches, for example. Similarly, a suitable thickness for substrate layers 220 is 0.030 inches, but may range from 0.015 inches to 0.050 inches, for example. The thickness of valve layer 210 and the thickness of substrate layers 220 may depart from the ranges listed above, however, depending upon the specific application for valve 200, the materials and manufacturing methods utilized, and the properties that valve 200 is intended to impart to the fluid system.

A benefit to locating substrate welds 250 adjacent to inlet 242, as depicted in FIG. 4, lies in the relatively large area of first surface 212a that is exposed to the fluid at outlet 244. As noted above, when the pressure of the fluid in inlet 242 is less than the pressure of the fluid at outlet 244, the force that the fluid in inlet 242 exerts on second surface 212b of valve layer 210 is not sufficient to overcome the force that the fluid at outlet 244 exerts on first surface 212a, thereby preventing valve layer 210 from separating and preventing the flow of fluid through valve 200. By configuring the position of valve layer 210 such that a relatively large area of first surface 212a is exposed to the fluid at outlet 244, the area of contact between second surface 212b and substrate layer 220b increases proportionally. One of the primary mechanisms that prevents fluid from passing through valve 200 is the hermetic contact properties of second surface 212b and substrate layer 220b. Accordingly, increased efficiency is achieved by having a relatively large portion of first surface 212a exposed to the fluid at outlet 244.

A method of manufacturing valve 200 integral with substrate layers 220 will now be discussed in relation to FIG. 5. The first bonding operation forms a first sub-assembly that includes substrate layer 220a and valve layer 210. More specifically, the first bonding operation forms the first sub-assembly by bonding a portion of valve layer 210 to substrate layer 220a to form substrate weld 250. In the second bonding operation, the sub-assemblies are aligned such that valve layer 210 makes contact with the proper portion of substrate layer 220b and valve layer 210 is positioned between substrate layers 220. Channel welds 230 and inlet weld beads 246 are then formed, thereby completing the manufacture of valve 200. As described in greater detail below, a blocking material may be applied to first surface 212a of valve layer 210 to prevent additional bonds from forming between valve layer 210 and substrate layer 220a during the second bonding operation. Alternately, the blocking material may be applied to a surface of substrate layer 220a, or the blocking material may be an additional element of material positioned between valve layer 210 and substrate layer 220a. The blocking material is not required, however, to manufacture valve 200.

Before performing the first bonding operation, valve layer 210 is formed. Valve layer 210 is depicted as having a rectangular geometry, but may have a plurality of alternate geometries that are also suitable for forming valve 200, including square, round, trapezoidal, or a non-regular geometry. One consideration regarding the geometry of valve layers 210 is the resulting length and width of channel 240. A channel 240 with a relatively long length may impart a greater opening pressure or lesser flow rate, for example, than a channel 240 with a relatively short length. A channel 240 with a relatively large width may also impart enhanced flow rate and lesser opening pressure, for example. Similarly, an outlet 244 with unbonded portions of valve layer 210 that has a relatively large surface area may seal more effectively than unbonded portions of valve layer 210 with a relatively small surface area. Outlet 244 may also be formed so as to flare outward and around the portion of channel 240 adjacent to outlet 244. Accordingly, valve layer 210 may have a variety of geometries and the specific geometry chosen should depend upon the specific application for which valve 200 is intended to be utilized and the specific properties that valve 200 is intended to possess. Examples of properties that may be affected by changes in geometry or materials include opening pressure, flow rate, and back flow rate.

Following the formation of valve layer 210, it is positioned with respect to substrate layers 220. Typically, substrate layers 220 become one or more components of a fluid system. With respect to system 10, for example, substrate layers 220 could form opposing sides of conduit 30. Accordingly, valve layer 210 should be positioned on substrate layer 220b such that inlet 242 will be fluidly-accessible from the side of conduit 30 adjacent to pump chamber 20, and outlet 244 will be fluidly-accessible from the side of conduit 30 adjacent to pressure chamber 50, thereby placing pump chamber 20 in fluid communication with pressure chamber 50.

Figure 5A:
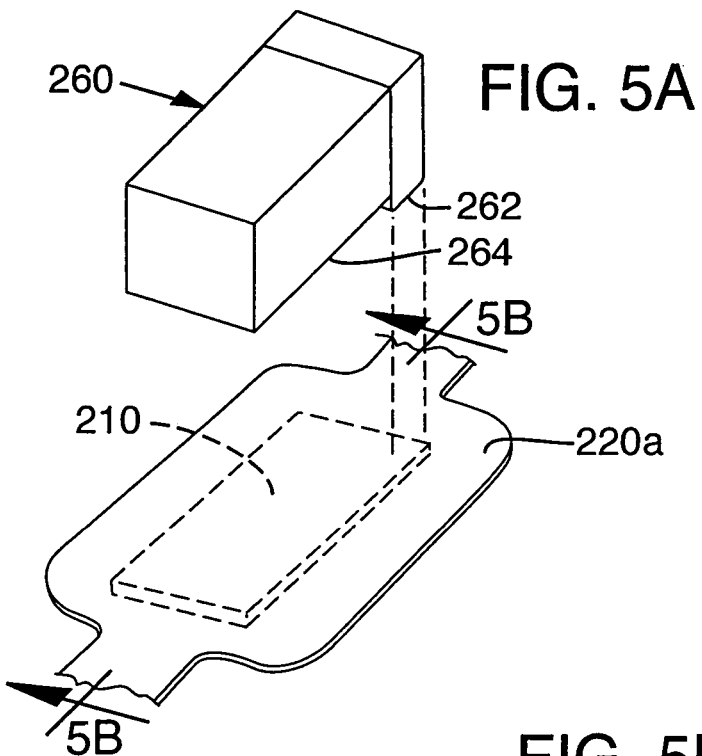
FIG. 5A is a perspective view of a first bonding operation in accordance with the second embodiment.
Figure 5B:
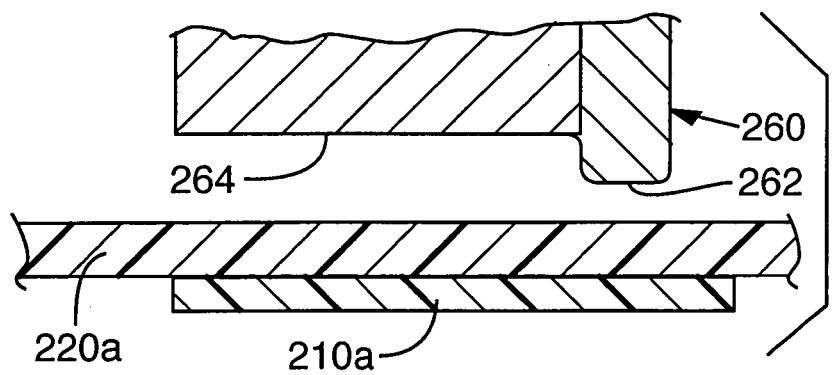
FIG. 5B is a cross-sectional view of the first bonding operation prior to formation of a substrate weld, as defined by line 5B—5B in FIG. 5A.

Once valve layer 210 is positioned with respect to substrate layer 220a, substrate weld 250 may be formed. With reference to FIGS. 5A and 5B, valve layer 210, substrate layer 220a, and an RF die 260 are depicted in their relative positions. Note that RF die 260 includes a bonding portion 262 and a weld flow director portion 264. Bonding portion 262 generates the RF energy that forms substrate weld 250. The contact surface of bonding portion 262 has a rectangular shape with dimensions that are sufficient to bond valve layer 210 to substrate layer 220a across at least the width of inlet 242. Accordingly, bonding portion 262 will heat and bond at least a portion of the width of valve layer 210 to substrate layer 220a. Weld flow director portion 264 is configured to prevent a weld bead from forming adjacent to substrate weld 250 and between other portions of valve layer 210 and substrate layer 220a. Accordingly, weld flow director portion 264 places additional pressure upon the portion of valve layer 210 that is intended to remain unbonded to substrate layer 220a. In the configuration depicted in FIG. 5A, weld flow director portion 264 is not configured to prevent the formation of a weld bead around other portions of substrate weld 250. In further embodiments, weld flow director portion 264 may extend partially or completely around bonding portion 262. As with RF die 160 of the first embodiment, RF die 260 may have a stepped configuration that reduces the overall thickness of layers 210 and 220 in the area of substrate weld 250.

Figure 5C:
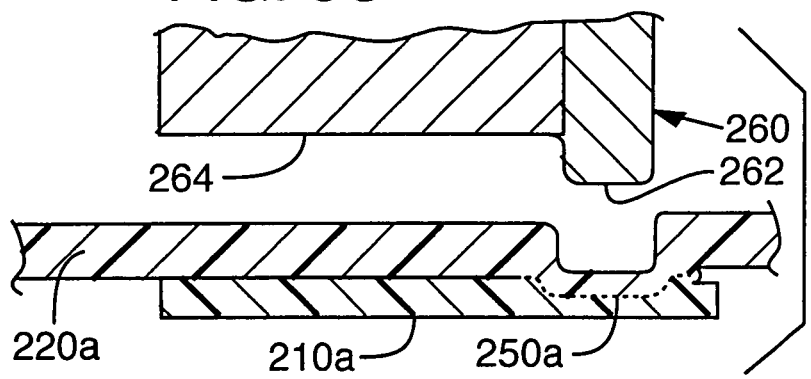
FIG. 5C is a cross-sectional view, as depicted in FIG. 5B, of the first bonding operation following formation of the substrate weld.

In order to form substrate weld 250, substrate layer 220a and valve layer 210 are positioned and compressed between RF die 260 and another surface, such as a flat plate or another die (not depicted). FIG. 5B is a cross-section that depicts the positions of RF die 260, substrate layer 220a, and valve layer 210 prior to bonding. FIG. 5C depicts the components following the formation of substrate weld 250. Once substrate weld 250 is formed, the first sub-assembly is complete. Note that the first sub-assembly is substantially similar to the first sub-assembly from the first embodiment.

The second bonding operation joins the first sub-assembly with the substrate layer 220b to form valve 200. When incorporating valve 200 into fluid systems that are more complex than fluid system 10 further bonding operations may be required to form other components of the fluid system. Valve 200, however, is generally capable of being formed by the two bonding operations described herein. One skilled in the art will be able to make modifications to the method described herein to integrate valve 200 into more complex fluid systems.

Figure 5D:
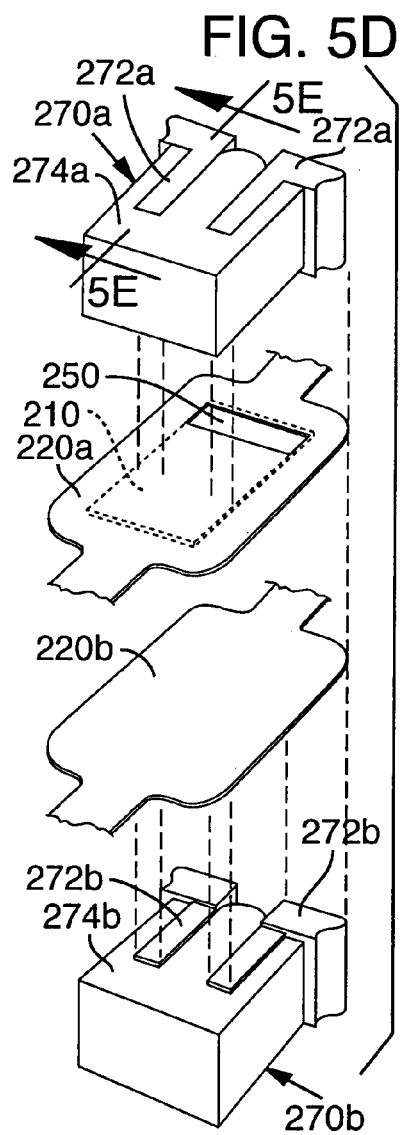
FIG. 5D is a perspective view of a second bonding operation in accordance with the second embodiment.
Figure 5E:
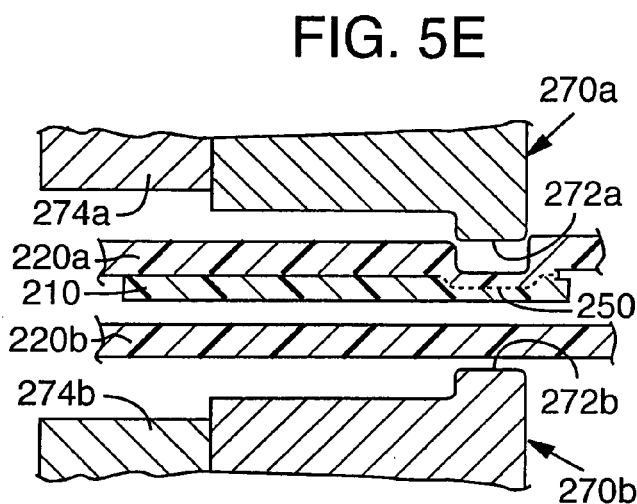
FIG. 5E is a cross-sectional view of the second bonding operation prior to formation of channel welds, as defined by line 5E—5E in FIG. 5D.

With reference to FIGS. 5D and 5E, the first sub-assembly is aligned such that valve layer 210 is adjacent to substrate layer 220b. That is, valve layer 210 is located between substrate layers 220. Conventional methods may be employed to properly align the first sub-assembly with substrate layer 220b. For example, locating pins that correspond with apertures in the first sub-assembly and substrate layer 220b may be used. Locating pins may also be utilized in prior portions of the method to form the first sub-assembly, thereby ensuring that valve layer 210 is properly positioned during bonding with substrate layers 220a.

Once the first sub-assembly is properly aligned, an RF die 270a and a separate RF die 270b are positioned on either side of the aligned sub-assemblies and used to form channel welds 230. RF dies 270 may also include portions that bond substrate layers 220 to each other to form a fluid system component, such as conduit 30 in fluid system 10, for example. RF dies 270 each include a bonding portion 272 and a weld flow director portion 274. The sections of RF dies 270 that would be utilized to bond substrate layers 220 to each other are omitted from the depiction of RF dies 270 in FIG. 5D. Accordingly, the present discussion will focus on the bonding of second side 212b of valve layer 210 to substrate layer 220b.

In addition to forming channel welds 230, the second bonding operation inhibits the formation of weld beads adjacent to channel welds 230, except in the area of inlet 242. Bonding portions 272 are configured such that channel welds 130 are formed adjacent to inlet 242. Weld flow director portions 274 are located around the segments of bonding portions 272 responsible for forming channel welds 230. Accordingly, weld flow director portions 274 are located between the segments of bonding portions 272 that form channel welds 230 to prevent the formation of weld beads in channel 240. Weld flow director portions 274 also extend over the area of outlet 244, but do not extend between the segments of bonding portions 272 in the area of inlet 242. This configuration prompts the formation of inlet weld beads 246 in inlet 242 and between valve layer 210 and substrate layer 220b. As discussed above, inlet weld beads 246 place inlet 242 in the open position, thereby facilitating the entry of fluid in inlet 242.

Figure 5F:
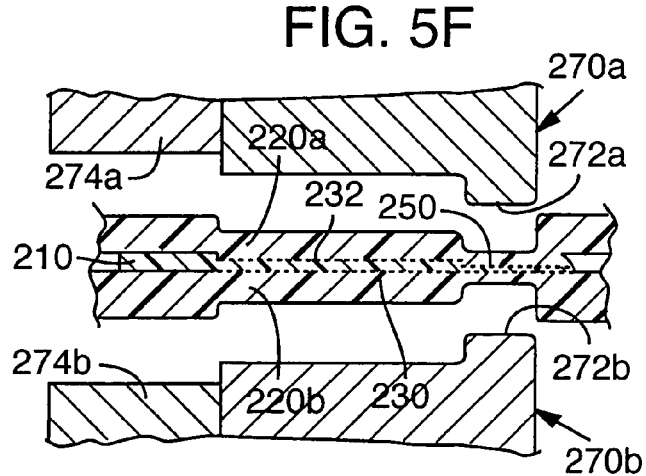
FIG. 5F is a cross-sectional view, as depicted in FIG. 5E, of the second bonding operation following formation of the channel welds.
Figure 6A:
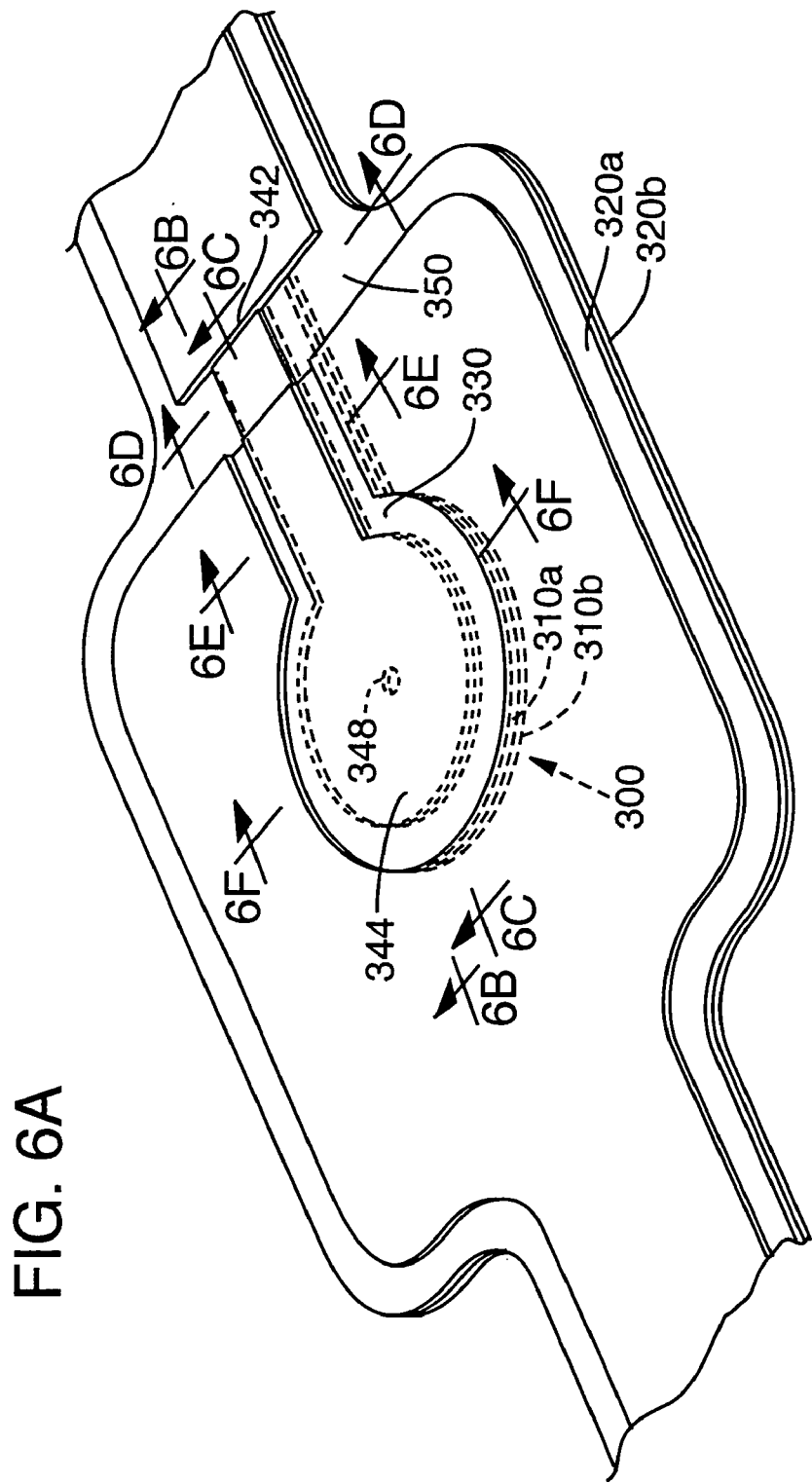
FIG. 6A is a perspective view of a third valve in accordance with a third embodiment of the present invention.
Figure 6E:
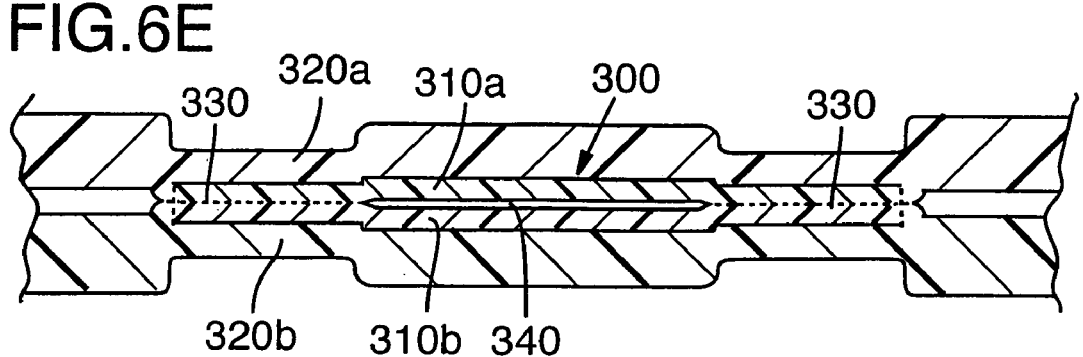
FIG. 6E is a fourth cross-sectional view of the third valve, as defined by line 6E—6E in FIG. 6A.
Figure 6F:
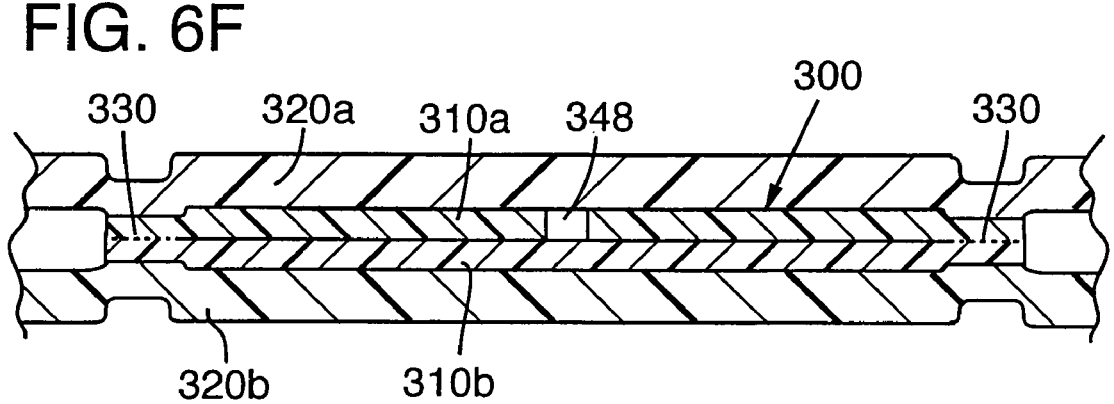
FIG. 6F is a fifth cross-sectional view of the third valve, as defined by line 6F—6F in FIG. 6A.
Figure 6G:
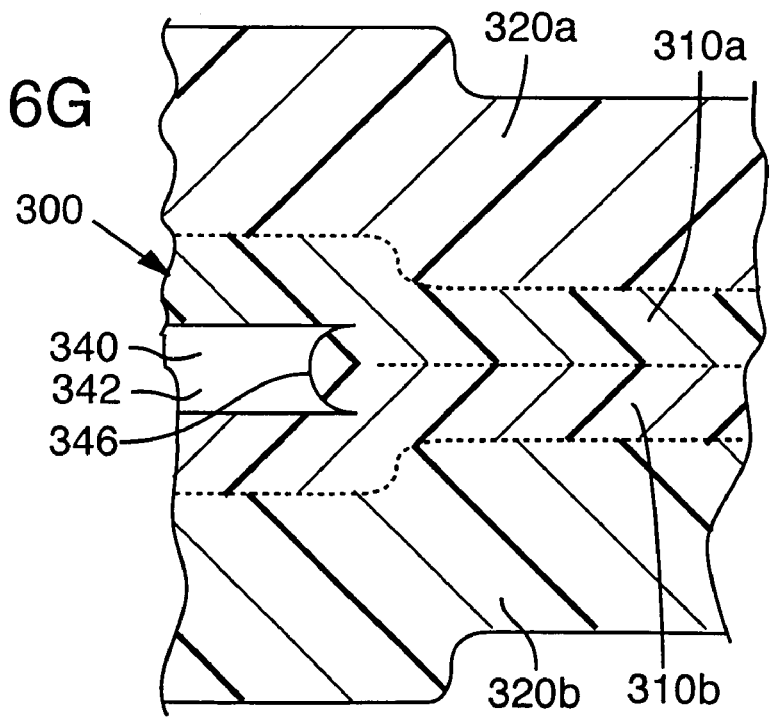
FIG. 6G is an enlarged view of a weld bead depicted in FIG. 6D.

Once the first sub-assembly and substrate layer 220b are aligned with RF dies 270, they are compressed between RF dies 270 to form channel welds 230. In addition, excess molten portions collect adjacent to inlet 242 to form inlet weld beads 246 due to the lack of weld flow director portions 274 in this area. FIG. 5E is a cross-section that depicts RF dies 270, the first sub-assembly, and substrate layer 220b prior to the second bonding operation. FIG. 5F depicts the components following the formation of channel welds 230. As with RF dies 170 of the first embodiment, at least RF die 270a may have a stepped configuration with three offset surfaces. RF die 270b, however, may only have two offset surfaces, as depicted in FIGS. 5E and 5F, between bonding portion 272b and weld flow director portion 274b. Alternately, RF die 270b may have a flat surface that does not include the highest step depicted in FIGS. 5E and 5F.

In the method described above, substrate weld 250, as formed in the first bonding operation, is the solitary attachment site between valve layer 210 and substrate layer 220a. In order to prevent additional bonding between valve layer 210 and substrate layers 220a during the second bonding operation, a blocking material may be applied to a portion of first surface 212a before the first bonding operation. The blocking material should be applied or positioned adjacent to the portion of first surface 212a where bonding would otherwise occur, but not to portions of first surface 212 where bonding is intended to occur. For example, the blocking material should not be applied to the area of first surface 212a where substrate weld 250 is intended to occur, thereby facilitating the formation of substrate weld 250 during the first bonding operation. An appropriate location for applying a blocking material to first surface 212a includes the area opposite the portion of second surface 212b that is bonded to form channel welds 230, but not adjacent to inlet 242. Alternatively, a blocking material may be omitted from first surface 212a, thereby forming a bond between substrate layers 220 and valve layer 210 during the second bonding operation.

THIRD EMBODIMENT

The components and function of a valve 300, depicted in FIG. 6, will now be discussed in greater detail. Valve 300 includes a first valve layer 310a and a second valve layer 310b that are positioned between a first substrate layer 320a and a second substrate layer 320b. With respect to fluid system 10, substrate layers 320 are analogous to the two polymer layers that form pump chamber 20, conduit 30, or pressure chamber 50, for example. One skilled in the art will recognize, however, that substrate layers 320 may also be the materials that form other types of fluid system components.

First valve layer 310a and second valve layer 310b are bonded together by a pair of channel welds 330 that define a channel 340 positioned between valve layers 310 and between opposite sides of channel weld 330. Channel 340 includes an inlet 342 and an outlet 344. Inlet 342 is biased in the open position by two inlet weld beads 346 formed of polymer material that collects in inlet 342 and adjacent to channel weld 330 during the bonding of first valve layer 310a and second valve layer 310b. Unlike valve 100 of the first embodiment, channel welds 330 are joined in the area of outlet 344 and enclose outlet 344. Accordingly, an outlet aperture 348 is formed through valve layer 310a. Each valve layer 310 includes an outer surface 312 and an inner surface 314. With regard to valve layer 310a, for example, outer surface 312a lies adjacent to substrate layer 320a and is bonded to substrate layer 320a. Valve layer 310a also includes an inner surface 314a that lies adjacent to valve layer 310b. Similarly, valve layer 310b includes an outer surface 312b that lies adjacent to substrate layer 320b and an opposite inner surface 314b that lies adjacent to inner surface 314a.

Valve 300 also includes two substrate welds 350 that attach valve layers 310 to substrate layers 320. More specifically, substrate welds 350 attach valve layer 310a to substrate layer 320a and attach valve layer 310b to substrate layer 320b. As depicted in FIG. 6, substrate welds 550 are located adjacent to inlet 342. Substrate welds 350 may also be positioned adjacent to other portions of valve 300.

Valve 300 operates in a manner that is similar to valve 100 of the first embodiment. Fluid flows through channel 340 and in the direction from inlet 342 to outlet 344. Fluid then exits valve 300 by passing through outlet aperture 348. Valve 300, however, significantly limits fluid flow in the opposite direction. As noted, inlet weld beads 346 bias inlet 342 in the open position. This configuration ensures that the fluid in the fluid system may enter at least the portion of channel 340 formed by inlet 342. As with the prior embodiments, the primary factor that determines whether the fluid may pass through valve 300 is the relative difference in pressure between the fluid in inlet 342 and the fluid at outlet 344. When the pressure of the fluid in inlet 342 exceeds the pressure of the fluid at outlet 344 plus an opening pressure of valve 300, the force that the fluid in inlet 342 exerts on inner surfaces 314 of valve layers 310 is sufficient to overcome the force that the fluid at outlet 344 exerts on outer surfaces 312, thereby permitting valve layers 310 to separate. When valve layers 310 separate, fluid may pass through channel 340 and exit valve 300 through outlet aperture 348. When the pressure of the fluid in inlet 342 is less than the pressure of the fluid at outlet 344, however, the force that the fluid in inlet 342 exerts on inner surfaces 314 of valve layers 310 is not sufficient to overcome the force that the fluid at outlet 342 exerts on outer surfaces 312, thereby preventing valve layers 310 from separating. When valve layers 310 are not separated, channel 340 is effectively closed to fluid transfer.

Outlet 344 assists in preventing the passage of fluid through valve 300 by ensuring that valve layers 310 make a hermetic contact. Valve 300 is structured such that channel weld 330 surrounds outlet aperture 348, but is also spaced away from outlet aperture 348. The spacing ensures that valve layers 310 may make hermetic contact around outlet aperture 348, thereby preventing fluid from passing between valve layers 310. Inner surfaces 314 may include a smooth, cohesive surface that facilitates closure of valve 300. Accordingly, the characteristics of inner surfaces 314 may also contribute to the hermetic contact and facilitate one-directional fluid flow through valve 300. The considerations discussed in relation to valves 100 and 200 are also relevant to valve 300. Accordingly, suitable materials for valve layers 310 and substrate layers 320 include thermoplastic polyurethane, urethane, polyvinyl chloride, and polyethylene. Based upon the above discussion, valve 300 is structurally similar to valve 100, the primary differences relating to the geometry of channel welds 330 and outlet 344.

As an alternative structure, depicted in FIG. 7, a similar valve 400 may be formed from a single valve layer 410 rather than the two valve layers 310 disclosed above. Accordingly, valve layer 410 may be positioned between two substrate layers 420 and a pair of channel welds 430 are formed between valve layer 410 and substrate layer 420b to define a channel 440 between valve layer 410 and substrate layer 420b. Channel welds 430 are joined in the area of an outlet 444 and surround an outlet aperture 448. Structurally, therefore, valve 400 is similar to valve 200, the primary difference relating to the geometry of channel welds 430 and outlet 444.

One skilled in the relevant art will recognize that the similarities in structure, function, and method for manufacture between valves 300 and 400 do not require a separate discussion regarding valve 400. Consequently, the following discussion regarding a method for manufacturing will focus primarily upon valve 300, with an understanding that similar concepts apply generally to valve 400.

A method of manufacturing valve 300 will now be discussed in relation to FIG. 8. In general, the method involves two bonding operations. The first bonding operation, depicted in FIGS. 8A–8C, forms a first sub-assembly and a second sub-assembly that each include one substrate layer 320 and one valve layer 310. More specifically, the first bonding operation forms the first sub-assembly by bonding a portion of valve layer 310a to substrate layer 320a to form substrate weld 350a with an RF die 360, which includes a bonding portion 362 and a weld flow director portion 364. The first bonding operation also forms a second sub-assembly through a similar operation that includes bonding a portion of valve layer 310b to substrate layer 320b to form substrate weld 350b. In the second bonding operation, depicted in FIGS. 8D–8G, the sub-assemblies are aligned such that valve layers 310 make contact and valve layers 310 are positioned between substrate layers 320. Channel welds 330 and inlet weld beads 346 are then formed, thereby completing the manufacture of valve 300. Weld beads 346 may also have an alternate configuration that extends at least partially down channel 340. As described in greater detail below, a blocking material may be applied to outer surfaces 312 of valve layers 310 to prevent additional bonds from forming between valve layers 310 and substrate layers 320 during the second bonding operation. Alternately, the blocking material may be applied to surfaces of substrate layers 320, or the blocking material may be an additional element of material that is positioned between valve layers 310 and substrate layers 320.

Before performing the first bonding operation, valve layers 310 are individually formed. Valve layers 310 are depicted as having a rectangular geometry with a circular portion forming outlet 344, but may have a plurality of alternate geometries that are also suitable for forming valve 300, including square, round, trapezoidal, or a non-regular geometry. In addition, outlet aperture 348 is formed in valve layer 310a. Once valve layers 310 are formed, they are positioned with respect to substrate layers 320. Typically, substrate layers, 320 become one or more components of a fluid system. With respect to system 10, for example, substrate layers 320 may form opposing sides of conduit 30, for example. Accordingly, valve layers 310 would be positioned on substrate layers 320 such that inlet 342 will be fluidly-accessible from the side of conduit 30 adjacent to pump chamber 20, and outlet 344 will be fluidly-accessible from the side of conduit 30 adjacent to pressure chamber 50, thereby placing pump chamber 20 in fluid communication with pressure chamber 50.

Figure 8A:
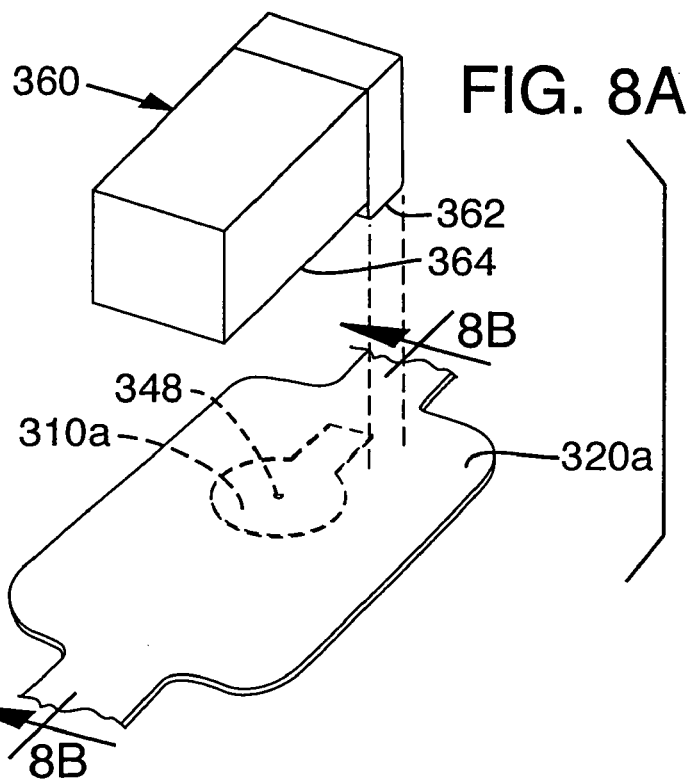
FIG. 8A is a perspective view of a first bonding operation in accordance with the third embodiment.
Figure 8B:
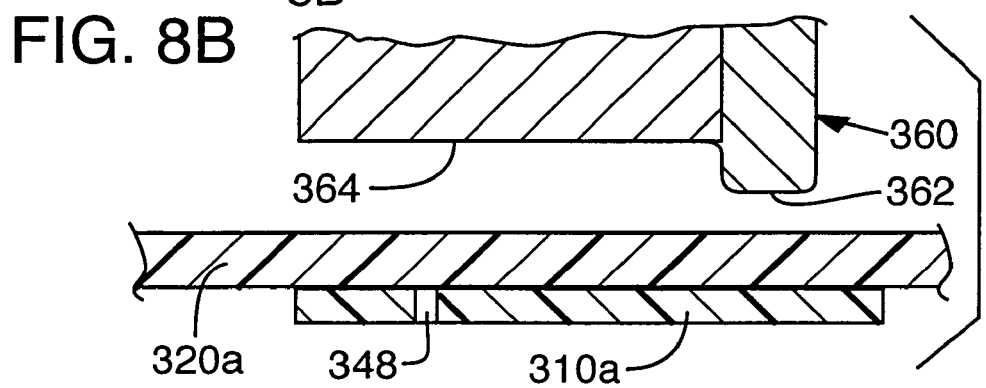
FIG. 8B is a cross-sectional view of the first bonding operation prior to formation of a substrate weld, as defined by line 8B—8B in FIG. 8A.

Following the positioning of valve layer 310a with respect to substrate layer 320a, substrate weld 350a may be formed through RF welding, for example. With reference to FIGS. 8A and 8B, valve layer 310a, substrate layer 320a, and an RF die 360 are depicted in their relative positions for purposes of the first bonding operation. Note that RF die 360 includes a bonding portion 362 and a weld flow director portion 364. Bonding portion 362 generates the RF energy that forms substrate weld 350a. The contact surface of bonding portion 362 has a rectangular shape with a width that corresponds to the width of valve layer 310a in the area of inlet 342. Accordingly, bonding portion 362 will heat and bond the width of valve layer 310a to substrate layer 320a. Weld flow director portion 364 is configured to prevent a weld bead from forming adjacent to substrate weld 350a and between other portions of valve layer 310a and substrate layer 320a. Accordingly, weld flow director portion 364 places additional pressure upon the portion of valve layer 310a that is intended to remain unbonded to substrate layer 320a. Weld flow director portion 364 is not, however, configured to prevent the formation of a weld bead around other portions of substrate weld 350a. In further embodiments, weld flow director portion 364 may extend partially or completely around bonding portion 362.

Figure 8C:
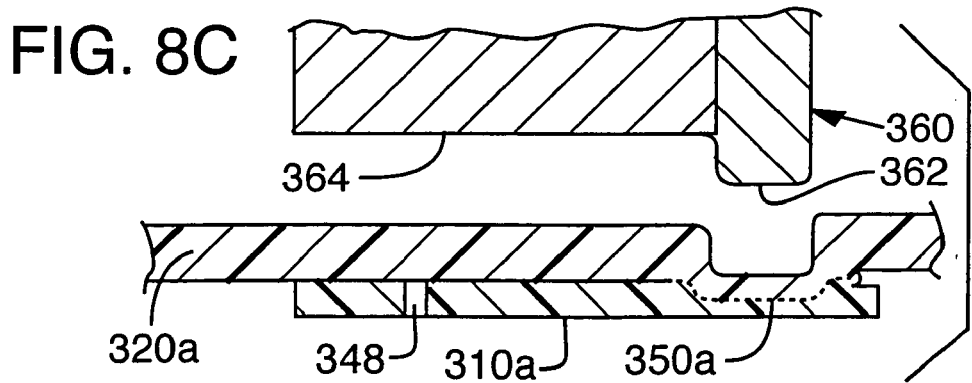
FIG. 8C is a cross-sectional view, as depicted in FIG. 8B, of the first bonding operation following formation of the substrate weld.

In order to form substrate weld 350a, substrate layer 320a and valve layer 310a are positioned and compressed between RF die 360 and another surface, such as a flat plate or another die (not depicted). FIG. 8B is a cross-section that depicts the positions of RF die 360, substrate layer 320a, and valve layer 310a prior to bonding. FIG. 8C depicts the components following the formation of substrate weld 350a. Once substrate weld 350a is formed, the first sub-assembly is complete. RF die 360 may have a stepped configuration, as with RF dies 160 and 260.

Following the formation of the first subassembly, the second sub-assembly may be formed using a similar procedure. The second sub-assembly includes second substrate layer 320b and second valve layer 310b that are bonded together to form substrate weld 350b. The concepts discussed above with regard to formation of the first sub-assembly are applicable to the second sub-assembly. Accordingly, the discussion will now focus on the remaining portions of the manufacturing process.

The second bonding operation joins the first sub-assembly with the second sub-assembly to form valve 300. When incorporating valve 300 into fluid systems that are more complex than fluid system 10 further bonding operations may be required to form other components of the fluid system. Valve 300, however, is generally capable of being formed by the two bonding operations described herein. One skilled in the art will be able to make modifications to the method described herein to integrate valve 300 into more complex fluid systems.

Figure 8D:
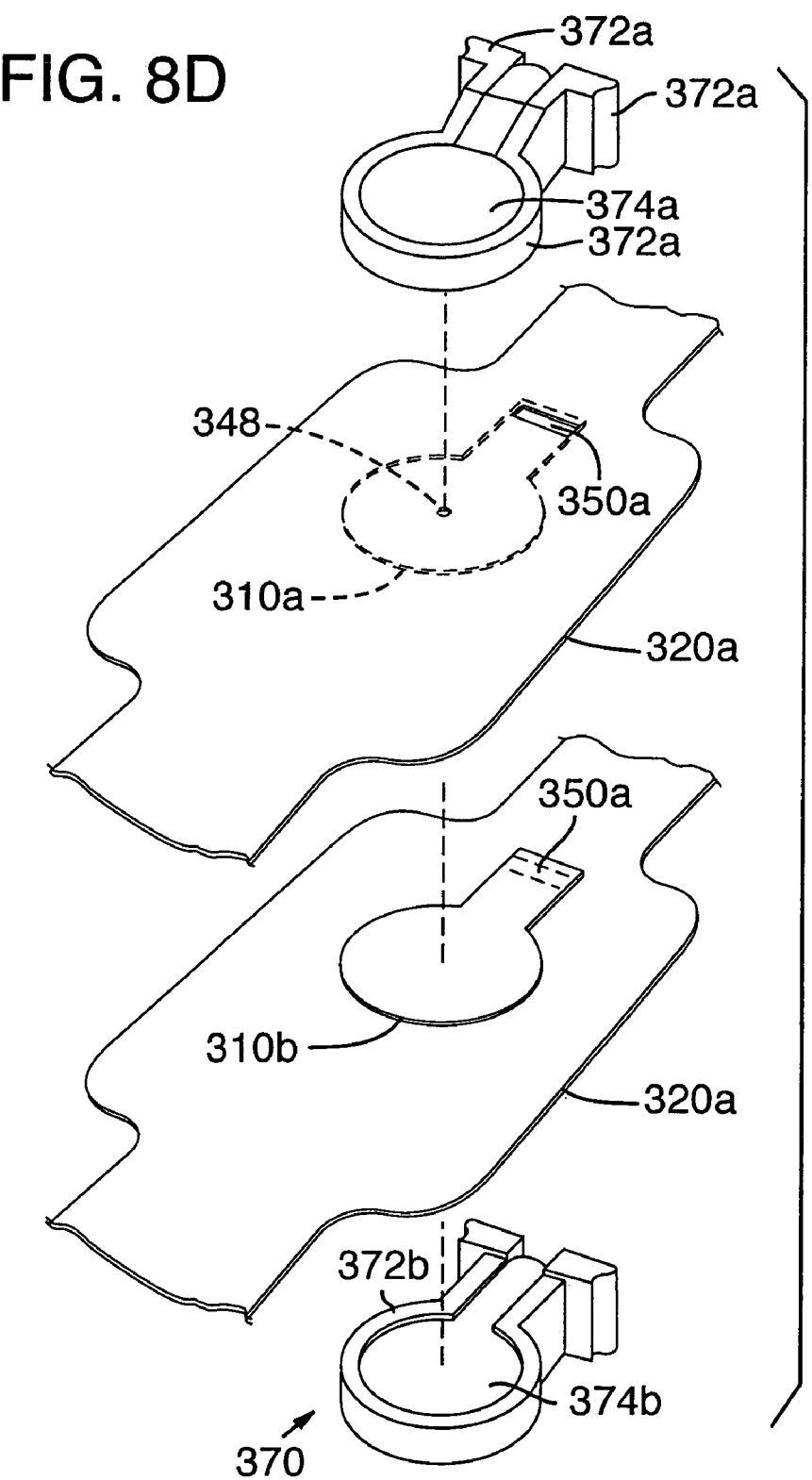
FIG. 8D is a perspective view of a second bonding operation in accordance with the third embodiment.

With reference to FIGS. 8D and 8E, the first and second sub-assemblies are aligned such that first valve layer 310a is adjacent to second valve layer 310b and first substrate weld 350a is adjacent to second substrate weld 350b. That is, valve layers 310 are located between substrate layers 320 and portions of first valve layer 310a are aligned with corresponding portions of second valve layer 310b. Conventional methods may be employed to properly align the first sub-assembly with the second sub-assembly. For example, locating pins that correspond with apertures in the each of the sub-assemblies may be used to securely and simply align the sub-assemblies during manufacture. Locating pins may also be utilized in prior portions of the method to form the sub-assemblies, thereby ensuring that valve layers 310 are properly positioned during bonding with substrate layers 320.

Once the sub-assemblies are properly aligned, an RF die 370a and a separate RF die 370b are positioned on either side of the aligned sub-assemblies and used to form channel welds 330. RF die 370 may also include portions that bond substrate layers 320 to each other to form conduit 30 in fluid system 10, for example. If, however, valve 300 is utilized as an inlet valve for a chamber, then RF die 370 may include portions that form a perimeter bond of the chamber. Note that the second bonding operation may be completed with a single RF die 370, but this arrangement may result in an uneven heating distribution that causes non-uniform melting of layers 310. RF dies 370 each include a bonding portion 372 and a weld flow director portion 374. The sections of RF dies 370 that would be utilized to bond substrate layers 320 to each other are omitted from the depiction of RF dies 370 in FIG. 8D. Accordingly, the present discussion will focus on the bonding of valve layers 310.

In addition to forming channel welds 330, the second bonding operation inhibits the formation of inlet weld beads 346 adjacent to channel welds 330, except in the area of inlet 342. Bonding portions 372 are configured such that channel welds 330 are formed adjacent to inlet 342. Weld flow director portions 374 are located within bonding portions 372. Accordingly, weld flow director portions 374 are located within the area of bonding portions 372 that form channel welds 330 to prevent the formation of weld beads in the area of outlet 344. Weld flow director portions 374 do not extend between the segments of bonding portions 372 in the area of inlet 342. This configuration prompts the formation of inlet weld beads 346 between valve layers 310 and in inlet 342. As discussed above, inlet weld beads 346 place inlet 342 in the open position, thereby facilitating the entry of fluid in inlet 342.

The geometry of RF dies 370 differs from the geometries of RF dies 170 and 270. In order to join channel welds 330, bonding portions 372 extend around outlet 344 and are joined in the area of outlet 344. Weld flow director portions 374 are centered around outlet aperture 348 to prevent the formation of weld beads in the area of outlet 348.

Figure 8G:
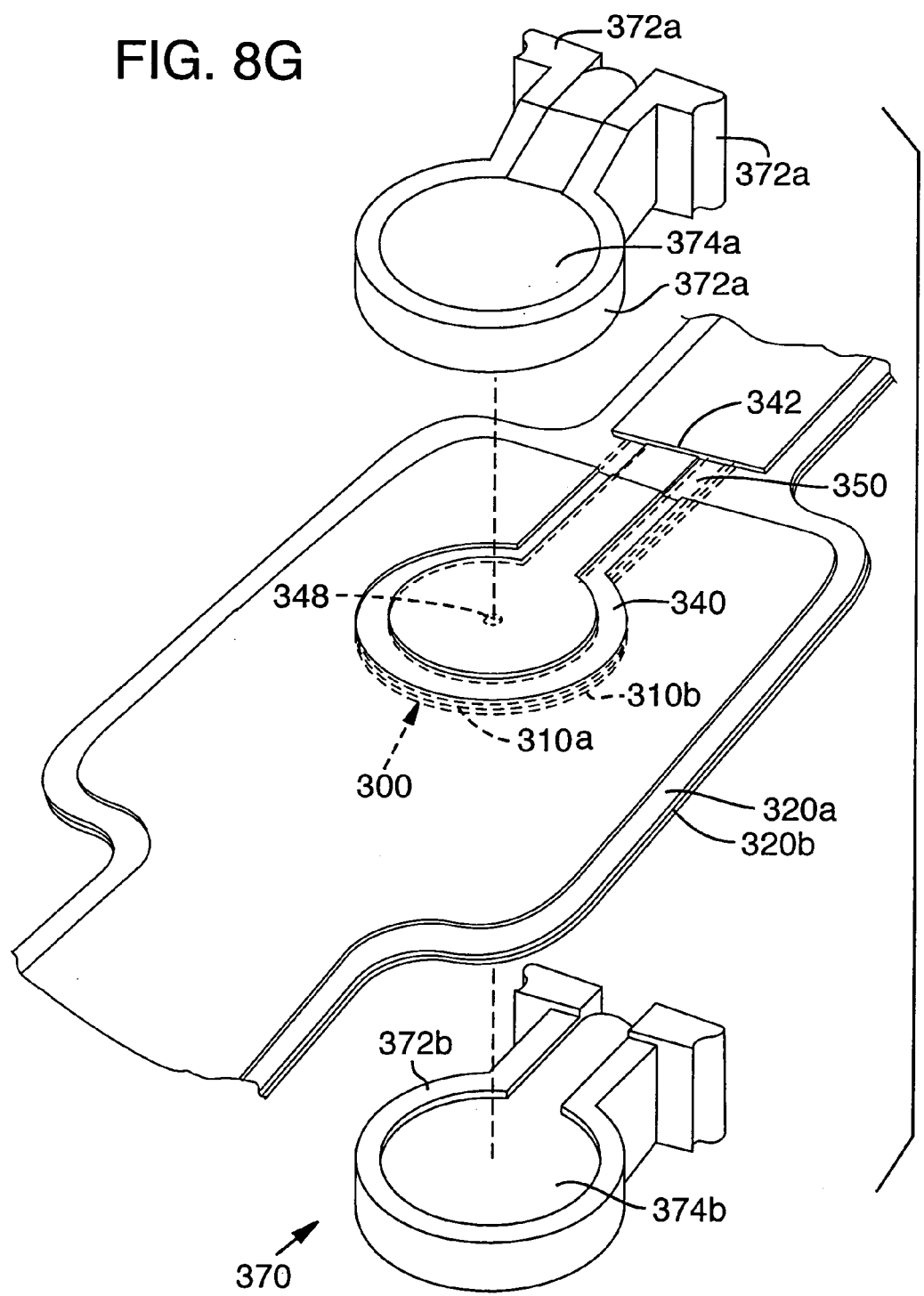
FIG. 8G is a perspective view of the second bonding operation, as depicted in FIG. 8D, following formation of the channel welds.

Once the sub-assemblies are aligned with RF dies 370, the sub-assemblies are compressed between RF dies 370 to form channel welds 330. In addition, excess molten portions of valve layers 310 collect adjacent to inlet 342 to form inlet weld beads 346 due to the lack of weld flow director portions 374 in this area. FIG. 8E is a cross-section that depicts RF dies 370 and the subassemblies prior to the second bonding operation. FIGS. 8F and 8G depict the components following the formation of channel welds 330. As with RF dies 170 and 270, the various areas of RF dies 370 may have a stepped or offset configuration. As a side effect of the second bonding operation, welds may be formed between valve layers 310 and substrate layers 320 unless a blocking material is utilized in these areas.

One skilled in the art will recognize that valve 300 may also be manufactured separate from substrate layers 320, and subsequently incorporated into a fluid system, by omitting steps of the method that involve substrate layers 320. Depending upon the final use for valve 300, a blocking material may be located within inlet 342 to prevent valve layers 310 from being bonded to each other when incorporating valve 300 into a fluid system.

The present invention is disclosed above and in the accompanying drawings with reference to a variety of embodiments. The purpose served by the disclosure, however, is to provide an example of the various features and concepts related to the invention, not to limit the scope of the invention. One skilled in the relevant art will recognize that numerous variations and modifications may be made to the embodiments described above without departing from the scope of the present invention, as defined by the appended claims.

That which is claimed is:

1. A valve comprising:
   a first valve layer and a second valve layer, each of the valve layers having an inlet portion and an outlet portion;
   a pair of spaced channel welds located between the valve layers, the channel welds bonding the valve layers to each other;
   a channel located between the valve layers and between the channel welds, the channel having an inlet located adjacent to the inlet portions and an outlet located adjacent to the outlet portions; and
   a pair of weld beads located in the inlet and adjacent the channel welds, the weld beads placing the inlet in an open configuration.

2. The valve of claim 1, wherein the valve layers are formed of a flexible polymer material.

3. The valve of claim 1, wherein the outlet portions of the valve layers extends beyond the channel welds such that at least a portion of the outlet portions are unbonded to each other.

4. The valve of claim 1, wherein the valve is positioned between a first substrate layer and a second substrate layer, a first substrate weld being formed between the first valve layer and the first substrate layer, and a second substrate weld being formed between the second valve layer and to second substrate layer.

5. The valve of claim 1, wherein the channel welds are joined at the outlet portions and an outlet aperture is formed in at least one of the valve layers.

6. The valve of claim 1, wherein a polymer material forming the first valve layer contacts a polymer material forming the second valve layer in the channel.

7. The valve of claim 1, wherein a blocking material that limits bonding between the first valve layer and the second valve layer is absent from the channel.

8. A valve comprising:
   a first valve layer having a first inlet end and an opposite first outlet end, the first valve layer defining an outlet aperture in the first outlet end;
   a second valve layer having a second inlet end and an opposite second outlet end;
   a pair of spaced channel welds located between the valve layers, the channel welds bonding the valve layers to each other, and the channel welds being joined at the outlet ends;
   a channel located between the valve layers and between the channel welds, the channel having an inlet located adjacent to the inlet ends and an outlet, the outlet aperture forming the outlet, and
   a pair of weld beads located in the inlet and adjacent the channel welds, the weld beads placing the inlet in an open configuration.

9. The valve of claim 8, wherein the valve layers are formed of a flexible polymer material.

10. The valve of claim 8, wherein the valve is positioned between a first substrate layer and a second substrate layer, a first substrate weld being formed between the first valve layer and the first substrate layer, and a second substrate weld being formed between the second valve layer and the second substrate layer.

11. The valve of claim 8, wherein a polymer material forming the first valve layer contacts a polymer material forming the second valve layer in the channel.

12. The valve of claim 8, wherein a blocking material that limits bonding between the first valve layer and the second valve layer is absent from the channel.

13. A valve comprising:
   a valve layer having an inlet portion and an outlet portion;
   a first substrate layer and a second substrate layer, the valve layer being positioned between the substrate layers;
   a substrate weld formed between the first substrate layer and the valve layer, the substrate weld bonding the valve layer with the first substrate layer;
   a pair of spaced channel welds located between the valve layer and the second substrate layer, the channel welds bonding the valve layer with the second substrate layer;
   a channel located between the valve layer and the second substrate layer and between the channel welds, the channel having an inlet located adjacent to the inlet portion and an outlet located adjacent to the outlet portion; and a pair of weld beads located in the inlet and adjacent the channel welds, the weld beads placing the inlet in an open configuration.

14. The valve of claim 13, wherein the valve layer, the first substrate layer, and the second substrate layer are formed of a flexible polymer material.

15. The valve of claim 13, wherein the outlet portion of the valve layer extends beyond the channel welds such that at least a portion of the outlet portion is unbonded to the second substrate layer.

16. The valve of claim 13, wherein the channel welds are joined at the outlet portion and an outlet aperture is formed in the valve layer.

17. The valve of claim 13, wherein a polymer material forming the valve layer contacts a polymer material forming the first valve layer in the channel.

18. The valve of claim 13, wherein a blocking material that limits bonding between the valve layer and the first substrate layer is absent from the channel.

19. A valve comprising:
a valve layer having an inlet end and an opposite outlet end, the valve layer defining an outlet aperture in the outlet end;
a first substrate layer and a second substrate layer, the valve layer being positioned between the substrate layers;
a substrate weld formed between the first substrate layer and the valve layer, the substrate weld bonding the valve layer with the first substrate layer;
a pair of spaced channel welds located between the valve layer and the second substrate layer, the channel welds bonding the valve layer with the second substrate layer, and the channel welds being joined at the outlet end;
a channel located between the valve layer and the second substrate layer and between the channel welds, the channel having an inlet located adjacent to the inlet end and an outlet, the outlet aperture forming the outlet; and
a pair of weld beads located in the inlet and adjacent the channel welds, the weld beads placing the inlet in an open configuration.

20. The valve of claim 19, wherein the valve layer, the first substrate layer, and the second substrate layer are formed of a flexible polymer material.

21. The valve of claim 19, wherein the outlet end of the valve layer extends beyond the channel welds such that at least a portion of the outlet end is unbonded to the second substrate layer.

22. The valve of claim 19, wherein a polymer material forming the first valve layer contacts a polymer material forming the second valve layer in the channel.

23. The valve of claim 19, wherein a blocking material that limits bonding between the first valve layer and the second valve layer is absent from the channel.

24. A valve comprising:
a pair of valve layers formed of a flexible polymer material, each of the valve layers having an inlet portion and an outlet portion;
a pair of channel welds that bond the valve layers to each other;
a channel located between the valve layers and between the channel welds, the channel having an inlet located adjacent to the inlet portions and an outlet located adjacent to the outlet portions; and
at least one weld bead located in the inlet and adjacent at least one of the channel welds, the at least one weld bead placing the inlet in an open configuration.

25. The valve of claim 24, wherein the outlet portions of the valve layers extend beyond the channel welds such that at least a portion of the outlet portions are unbonded to each other.

26. The valve of claim 24, wherein the valve is positioned between a first substrate layer and a second substrate layer, a first substrate weld being formed between the first valve layer and the first substrate layer, and a second substrate weld being formed between the second valve layer and the second substrate layer.

27. The valve of claim 24, wherein the channel welds are joined at the outlet portions and an outlet aperture is formed in at least one the valve layers.

28. The valve of claim 24, wherein a polymer material forming the first valve layer contacts a polymer material forming the second valve layer in the channel.

29. The valve of claim 24, wherein a blocking material that limits bonding between the first valve layer and the second valve layer is absent from the channel.

* * * * *